(12) United States Patent
Vulcano et al.

(10) Patent No.: US 10,369,702 B2
(45) Date of Patent: Aug. 6, 2019

(54) AUTOMATED WORK PIECE MOMENT OF INERTIA (MOI) IDENTIFICATION SYSTEM AND METHOD FOR SAME

(71) Applicant: Raytheon Company, Waltham, MA (US)

(72) Inventors: Anthony R. Vulcano, Vail, AZ (US); Vonn L. Holyoak, Vail, AZ (US); Bryan R. Moosman, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 108 days.

(21) Appl. No.: 15/406,944

(22) Filed: Jan. 16, 2017

(65) Prior Publication Data

US 2018/0104825 A1    Apr. 19, 2018

Related U.S. Application Data

(60) Provisional application No. 62/409,317, filed on Oct. 17, 2016.

(51) Int. Cl.
| | |
|---|---|
| *B25J 13/00* | (2006.01) |
| *B25J 13/08* | (2006.01) |
| *G01L 5/22* | (2006.01) |
| *B25J 11/00* | (2006.01) |
| *G01M 1/12* | (2006.01) |

(52) U.S. Cl.
CPC ............. *B25J 13/085* (2013.01); *B25J 11/00* (2013.01); *G01L 5/226* (2013.01); *G01M 1/122* (2013.01)

(58) Field of Classification Search
CPC combination set(s) only.
See application file for complete search history.

(56) References Cited

U.S. PATENT DOCUMENTS

| | | |
|---|---|---|
| 3,992,933 A | 11/1976 | Randolf, Jr. |
| 4,161,876 A | 7/1979 | Carpenter |
| 4,213,330 A * | 7/1980 | Brozel .................... G01M 1/10 73/487 |

(Continued)

FOREIGN PATENT DOCUMENTS

WO    WO-2018075525 A1    4/2018

OTHER PUBLICATIONS

"U.S. Appl. No. 14/689,125, Corrected Notice of Allowance dated Jan. 25, 2018", 2 pgs.

(Continued)

*Primary Examiner* — Jonathan L Sample
(74) *Attorney, Agent, or Firm* — Schwegman Lundberg & Woessner, P.A.

(57) ABSTRACT

A method and system for identifying a moment of inertia (MOI) of a work piece includes coupling the work piece to a manipulator assembly such as a 6-axis robotic arm or 3-axis gimbal. The manipulator assembly includes a force/torque sensor and a motion feedback sensor. The manipulator assembly moves the work piece with three-dimensional motion. Force, torque and movement measurements are made as the work piece moves. The MOI is identified according to the force and torque measurements and rotational accelerations derived from the measured movement. The measurements may be used to identify the products of inertia (POI) and center of mass of the work piece.

22 Claims, 18 Drawing Sheets

(56) References Cited

U.S. PATENT DOCUMENTS

| | | | | |
|---|---|---|---|---|
| 4,705,999 A * | 11/1987 | Soji | G05B 19/416 | 318/568.18 |
| 5,081,865 A * | 1/1992 | Schechter | G01M 1/122 | 73/483 |
| 5,581,166 A * | 12/1996 | Eismann | B25J 9/04 | 318/568.18 |
| 5,737,500 A * | 4/1998 | Seraji | B25J 9/1643 | 318/568.11 |
| 5,767,648 A * | 6/1998 | Morel | B25J 9/1628 | 318/568.1 |
| 5,781,705 A * | 7/1998 | Endo | B25J 9/1643 | 318/568.22 |
| 5,789,890 A * | 8/1998 | Genov | B25J 9/1615 | 318/567 |
| 5,811,951 A * | 9/1998 | Young | B25J 9/042 | 318/568.1 |
| 6,023,645 A * | 2/2000 | Harima | B25J 9/00 | 700/250 |
| 6,121,743 A * | 9/2000 | Genov | B25J 9/042 | 318/568.11 |
| 7,765,023 B2 * | 7/2010 | Oaki | B25J 9/1692 | 700/157 |
| 8,482,242 B2 * | 7/2013 | Nakasugi | B25J 9/1633 | 318/432 |
| 8,594,847 B2 | 11/2013 | Schreiber et al. | | |
| 8,874,357 B2 | 10/2014 | Wolfram et al. | | |
| 9,186,795 B1 | 11/2015 | Edsinger et al. | | |
| 9,272,743 B2 | 3/2016 | Thielman et al. | | |
| 9,897,507 B2 | 2/2018 | Vulcano | | |
| 2005/0166413 A1 * | 8/2005 | Crampton | B25J 13/088 | 33/503 |
| 2005/0246061 A1 * | 11/2005 | Oaki | B25J 9/1692 | 700/245 |
| 2007/0021870 A1 * | 1/2007 | Nagasaka | B25J 13/084 | 700/245 |
| 2007/0288124 A1 * | 12/2007 | Nagata | B25J 9/1694 | 700/258 |
| 2009/0249750 A1 * | 10/2009 | Black | B65B 5/061 | 53/443 |
| 2011/0004343 A1 * | 1/2011 | Iida | B25J 9/1638 | 700/253 |
| 2011/0135437 A1 * | 6/2011 | Takeshita | B25J 9/042 | 414/744.5 |
| 2012/0010748 A1 * | 1/2012 | Sasai | B25J 9/1674 | 700/254 |
| 2012/0035763 A1 * | 2/2012 | Motoyoshi | B25J 9/1694 | 700/258 |
| 2012/0179294 A1 * | 7/2012 | Sasai | B25J 9/1694 | 700/254 |
| 2012/0215357 A1 * | 8/2012 | Igarashi | B25J 9/1641 | 700/258 |
| 2012/0215358 A1 * | 8/2012 | Gettings | B25J 5/005 | 700/259 |
| 2012/0277912 A1 * | 11/2012 | Kirihara | B25J 9/1653 | 700/258 |
| 2012/0324991 A1 * | 12/2012 | Goertz | G01M 1/10 | 73/116.01 |
| 2013/0190926 A1 * | 7/2013 | Motoyoshi | B25J 9/1653 | 700/254 |
| 2013/0197792 A1 | 8/2013 | Wolfram et al. | | |
| 2014/0031977 A1 * | 1/2014 | Goldenberg | B25J 9/08 | 700/245 |
| 2014/0046483 A1 * | 2/2014 | Oaki | B25J 9/1633 | 700/253 |
| 2014/0288703 A1 * | 9/2014 | Takagi | B25J 9/1633 | 700/245 |
| 2014/0358280 A1 * | 12/2014 | Shinozaki | G05B 19/416 | 700/245 |
| 2015/0114149 A1 * | 4/2015 | Gomi | B25J 9/1635 | 74/89.14 |
| 2015/0120050 A1 * | 4/2015 | Gomi | B25J 9/1682 | 700/258 |
| 2015/0127147 A1 * | 5/2015 | Yamazaki | B25J 13/088 | 700/248 |
| 2015/0328771 A1 | 11/2015 | Yuelai | | |
| 2016/0305842 A1 | 10/2016 | Vulcano | | |

OTHER PUBLICATIONS

"U.S. Appl. No. 14/689,125, Response filed Dec. 5, 2017 to Examiner's Reasons for Allowance dated Sep. 5, 2017", 1 pg.

"International Application Serial No. PCT/US2017/056988, International Search Report dated Dec. 28, 2017", 2 pgs.

"International Application Serial No. PCT/US2017/056988, Written Opinion dated Dec. 28, 2017", 10 pgs.

"U.S. Appl. No. 14/689,125, Non Final Office Action dated May 5, 2017", 8 pgs.

"U.S. Appl. No. 14/689,125, Notice of Allowance dated Sep. 5, 2017", 8 pgs.

"U.S. Appl. No. 14/689,125, Response filed Aug. 7, 2017 to Non-Final Office Action dated May 5, 2017", 11 pgs.

Siouris, George, "The Generalized Missile Equations of Motion", Missile Guidance and Control Systems, Copyright Springer-Verlag New York, Inc., (2004). 15-51.

* cited by examiner

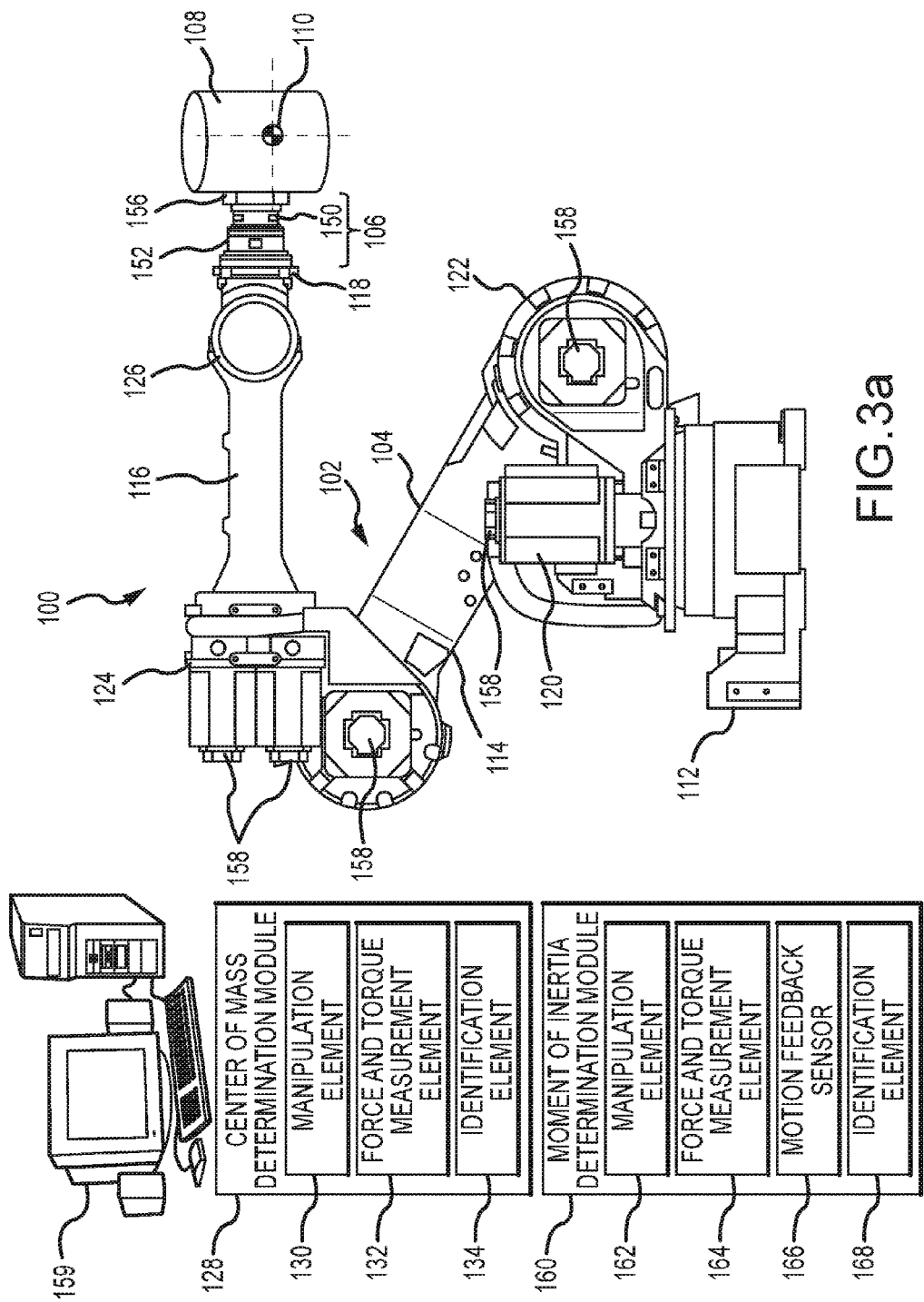

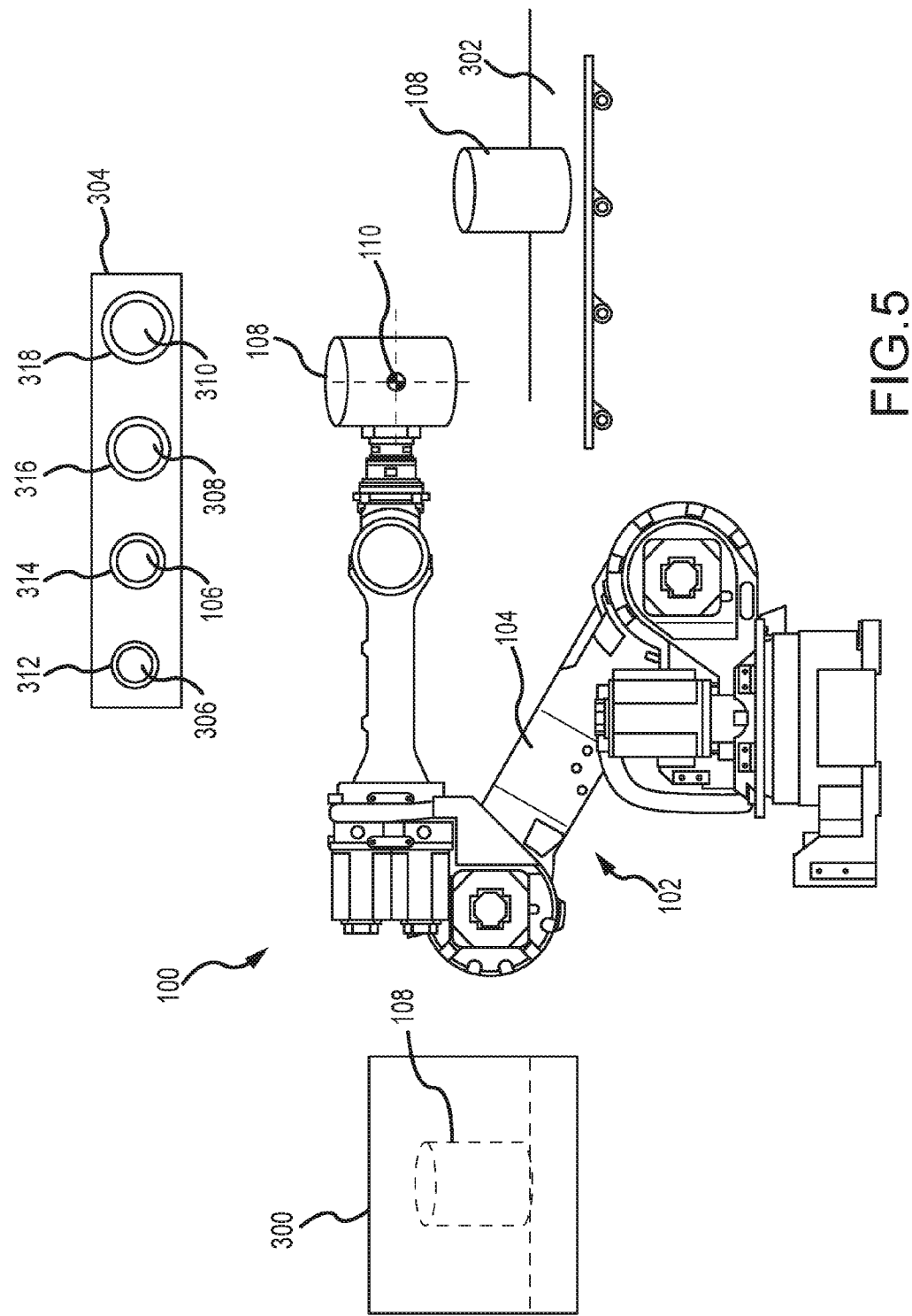

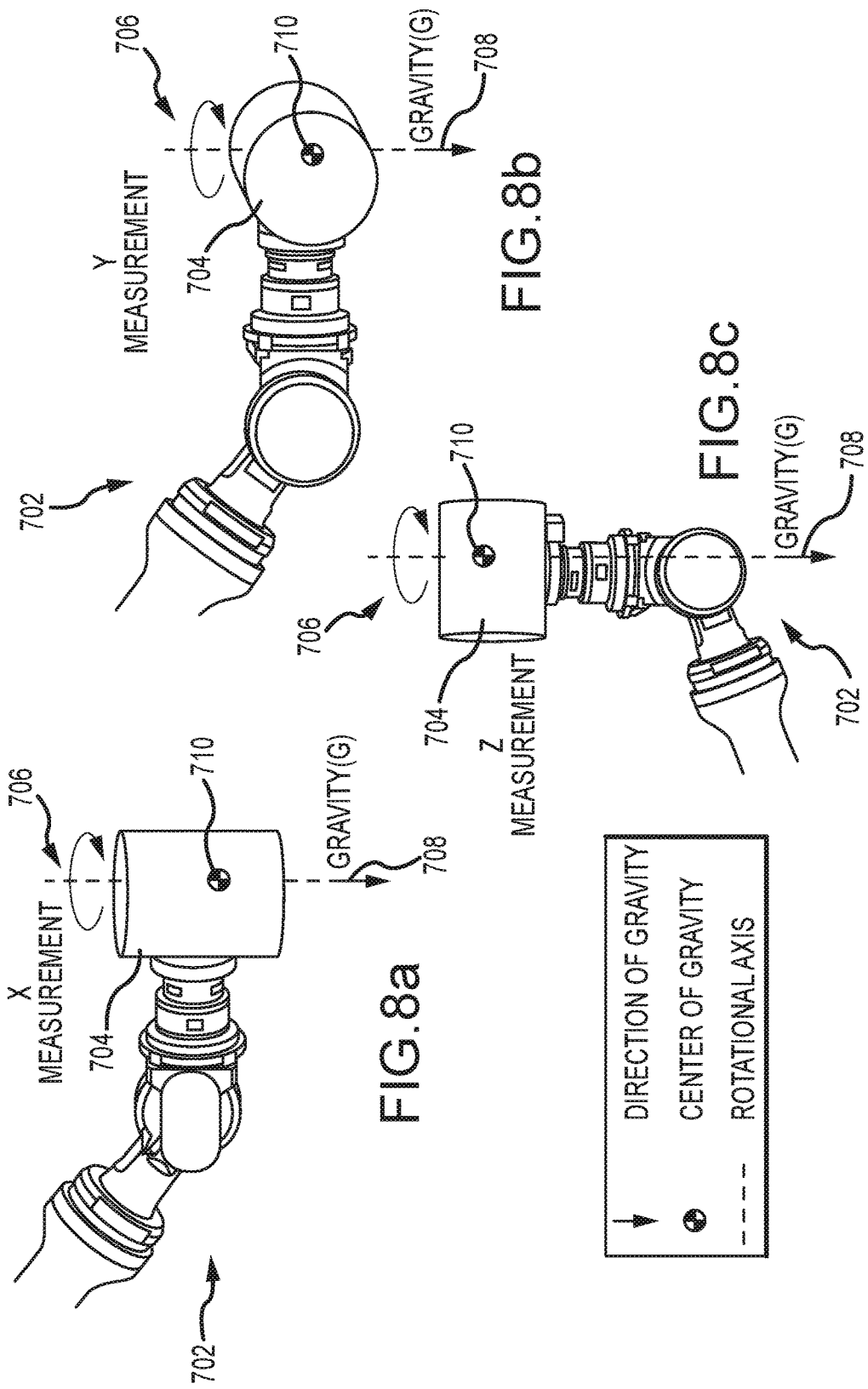

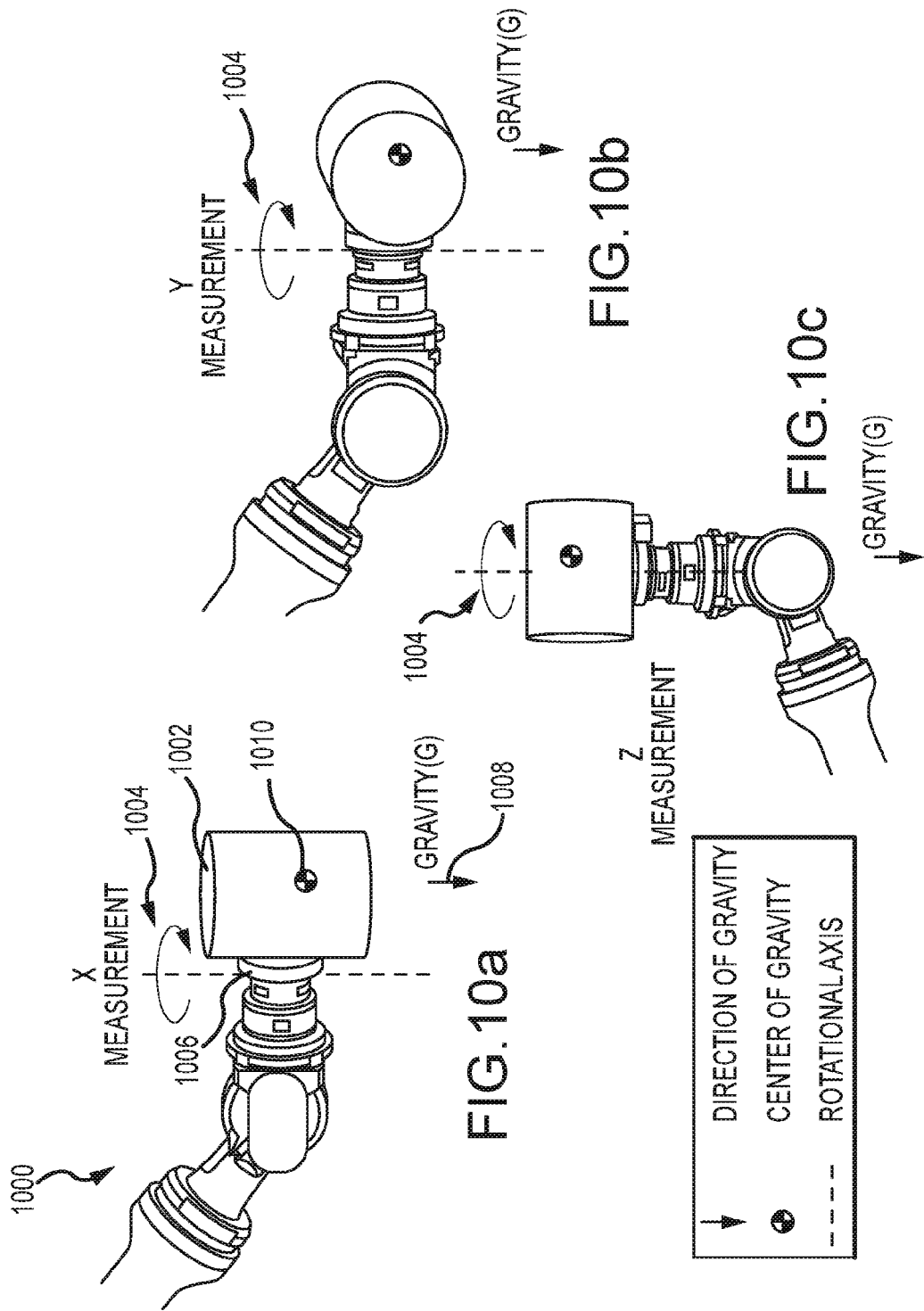

AUTOMATED WORK PIECE MOMENT OF INERTIA (MOI) IDENTIFICATION SYSTEM AND METHOD FOR SAME

RELATED APPLICATIONS

This application claims benefit of priority under 35 U.S.C. 119(e) to U.S. Provisional Application No. 62/409,317 entitled "AUTOMATED WORK PIECE MOMENT OF INERTIA (MOI) IDENTIFICATION SYSTEM AND METHOD FOR SAME" and filed on Oct. 17, 2016, the entire contents of which are incorporated by reference.

This application is related to U.S. application Ser. No. 14/689,125 entitled "AUTOMATED WORK PIECE CENTER OF MASS IDENTIFICATION SYSTEM AND METHOD FOR SAME" and filed on Apr. 17, 2015, the entire contents of which are incorporated by reference.

BACKGROUND OF THE INVENTION

Field of the Invention

This document pertains generally, but not by way of limitation, to the determination of the moment of inertia (MOI) for a work piece and in some instances to the determination of the center of mass/center of gravity (CG) or products of inertia (POI) for the work piece.

Description of the Related Art

Determining the moment of inertia (MOI) and products of inertia (POI) of the discrete parts of an overall assembly (a work piece) is relatively straightforward with MOI and POI calculations including knowledge of the dimensions of the part (e.g., shape and size) and its mass. Determination of the MOI and POI is much more complex when parts are incorporated as a whole into an overall assembly. The overall assembly has a variety of parts, in varying orientations, constructed with different materials that are coupled together. The assembly is difficult to model because of the various orientations of the parts and the varying materials. The determination of MOI and POI for the assembly is critical for the control of assemblies including launch vehicles and payloads (satellites and the like). For instance, the MOI and POI is accurately identified to ensure precise control including, but not limited to, control of pitch, yaw, roll and the like during launch, delivery and operation of a payload or the flight dynamics of any air or space vehicle.

BRIEF DESCRIPTION OF THE DRAWINGS

FIGS. 3*a* and 3*b* are side and isometric views showing one example of a 6-axis robotic system for manipulating a work piece and determining the MOI and POI of the work piece;

FIG. 5 is a perspective view of a 6-axis robotic system for determining the MOI of a work piece in an assembly line;

FIGS. 8*a*-8*c* is an embodiment showing the rotation of the work piece about an axis through its Cg and parallel to the gravity vector with the work piece aligned to each of the X, Y and Z-axes;

FIGS. 10*a*-10*c* is an embodiment showing the rotation of the work piece about an axis at the work piece interface parallel to the gravity vector with the work piece aligned to each of the X, Y and Z-axes;

DETAILED DESCRIPTION OF THE INVENTION

Figure 1:
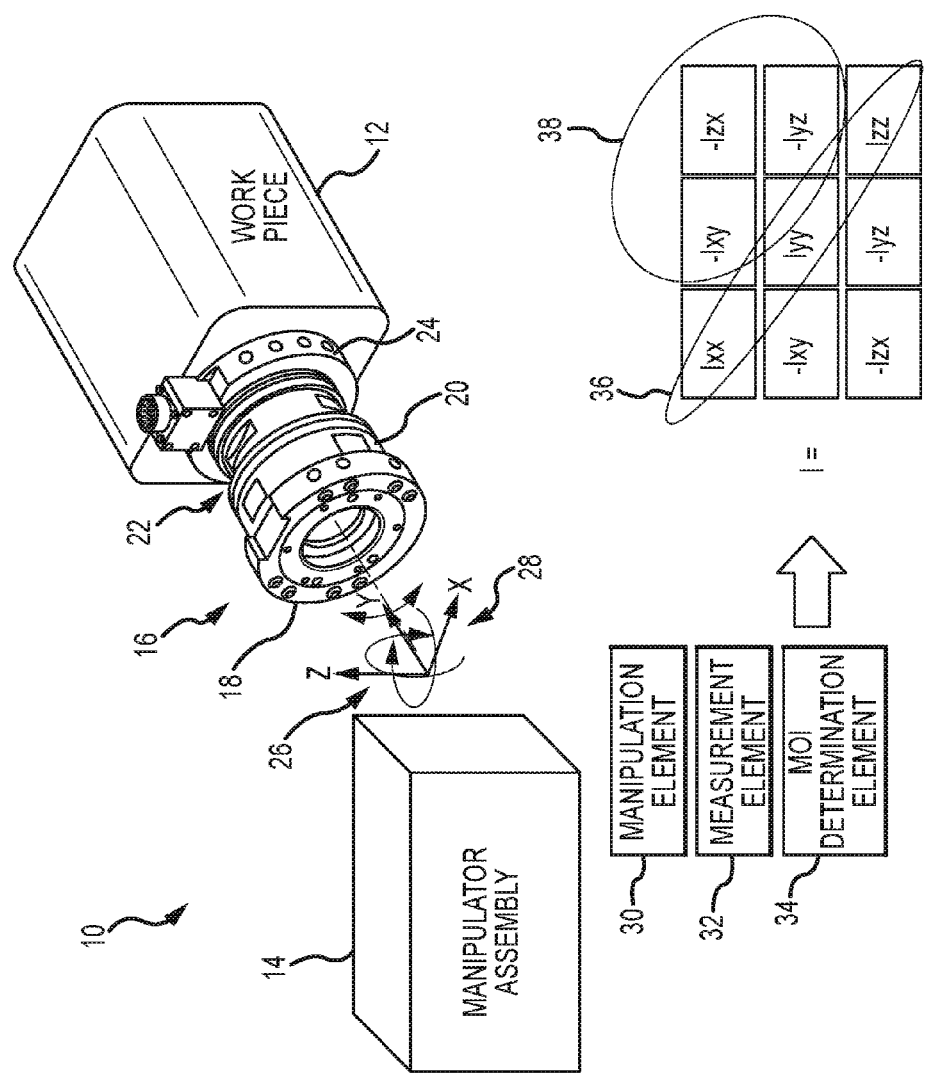
FIG. 1 is a perspective view showing one example of a system for manipulating a work piece and determining the MOI and POI of the work piece.

Load tables are used to measure moment of inertia (MOI) and products of inertia (POI) with assemblies or "work pieces" having one or more component parts assembled together. The assembly is brought to a facility having a load table of sufficient size and capacity to carry the assembly (e.g., in some example configured to weigh thousands of pounds). The assembly is fixed to the table (e.g., bolted) to ensure the assembly remains in a particular orientation. The unit is rotated on a rotational air bearing to preload a calibrated torsion bar. The unit is released and begins to pendulum as torsional energy is released and stored in the torsion bar. The frequency of this UUT oscillation is used to determine the MOI of the UUT. The unit is then removed and reinstalled to a different orientation. The process is repeated to measure the MOI around the second axis. The reorientation is done a third time to measure MOI for the last axis. The entire process may be repeated at 45-degree rotations from the defined axes to determine the POI. After the measurements are taken the assembly is unbolted from the load table and returned for further production, testing or the like. See U.S. Pat. No. 4,161,876 entitled "Mass Properties Measurement System".

The present inventors have recognized, among other things, that a problem to be solved can include decreasing time and labor needed to identify the MOI and POI of a work piece. Identification of the MOI and POI with load tables involves a relatively complex testing setup with a dedicated load table. Additionally, the work piece (sometimes weighing hundreds or thousands of pounds) is reoriented to ensure measurement of the MOI and POI in three orientations. Accordingly, in some examples, identifying the MOI and POI may take a half to full day to bolt the work piece to the table, take the necessary measurements, unbolt the work piece, and then reorient the work piece to take additional measurements. Removal of the work piece from production to identify the MOI and POI extends overall production time and requires significant additional labor.

In an example, the present subject matter can provide a solution to this problem, such as by automatically identifying a work piece MOI and POI through a manipulator assembly configured to measure force and torque of the work piece. The manipulator assembly rotates the work piece around 3 orthogonal axes (e.g., X,Y, Z or yaw, pitch, roll for MOI and at 45-degrees off-axis for POI) and measures force and torque incident on a force/torque sensor resulting from this dynamic motion. The force/torque sensor may comprise a composite force and torque sensor or separate force and torque sensors. A motion feedback sensor records the motion of the work piece. The force and torque measurements and motion measurements about each of the three axes are used to identify the MOI and POI of the work piece. The work piece center of mass may be known, computed or identified prior to or coincident with identification of work piece MOI and POI. The coupling of the work piece to the manipulation assembly, movement, measurements and identification of the center of mass and MOI/POI are conducted in a rapid and accurate fashion (e.g., 5 minutes or less).

In one example, the manipulator assembly includes a robotic manipulator arm configured to move with 6 degrees of freedom (3-axis rotation and 3-axis translation) to move the work piece in three-dimensional space. The manipulator arm moves the work piece in such a manner that the motion includes a rotational component about each of the three axes. The manipulator arm may be controlled to provide arbitrary 3D motion to include all of the rotational components in one set of measurements. Alternately, the manipulator arm may be controlled to orient the work piece about an axis and rotate the work piece about an axis (suitably parallel to the gravity vector and through the work piece center of gravity CG) to isolate the rotational components for each axis in different sets of measurements. The manipulator arm includes the force/torque sensor, and the force/ torque sensor measures forces and torques for the work piece transmitted between the work piece and the manipulator arm (e.g., weight, moment of the work piece relative to the arm or the like). Optionally, the force/torque sensor is included in an effector assembly. The manipulator arm includes the motion feedback sensor, which may be an IMU or motion encoders. The motion feedback sensor either directly measures the accelerations and velocities of the manipulator and work piece or measures the positions of the manipulator from which the accelerations and velocities of the work piece may be derived to a very high degree of accuracy. Optionally, the motion feedback sensor is included in the effector assembly. The effector assembly is grasped by the manipulator arm and the manipulator arm operates the effector assembly to couple with the work piece, for instance with manipulator and work piece interfaces, respectively.

In another example, the identification of a work piece MOI and possibly the POI and center of mass as described herein is conducted in a rapid fashion. Optionally, the MOI and POI identification is conducted as the work piece is moved between pieces of equipment or stations in a production or testing line. That is to say, as the manipulator assembly moves the work piece between pieces of equipment or stations the manipulator assembly moves the work piece in 3D motion and the sensors measure forces and torque and motion. Accordingly, the method, systems and devices described herein are readily incorporated in an existing or new production or testing line. Removal of the work piece from a line (perhaps for a day or longer) for MOI and POI identification is thereby avoided.

This overview is intended to provide an overview of subject matter of the present patent application. It is not intended to provide an exclusive or exhaustive explanation of the invention. The detailed description is included to provide further information about the present patent application.

FIG. 1 shows one example of a MOI determination system 10. As described herein the MOI determination system 10 is configured to measure and identify the MOI of a work piece, such as the work piece 12 coupled with the MOI determination system 10. The work piece MOI is defined with respect to a specified three-axis coordinate system and for a specific axis in that coordinate system, typically an axis through the work piece center of mass/center of gravity CG. The system may also be configured to measure and identify the POI and center of mass of work piece 12. In different embodiments the center of mass/CG may be identified in a separate test procedure conducted prior to the MOI determination or in the same test procedure coincident with the MOI determination.

As shown, the MOI determination system 10 includes a manipulator assembly 14, an effector interface 18 and an effector assembly 16 configured to provide a mechanical and electrical interface with work piece 12. In different embodiments, the manipulator assembly 14 may be configured to provide 6-axis motion 26 (translation and rotation in X, Y, Z axes 28 or translation and rotation at 45 degrees off of the X, Y, Z axes) such as by a robotic arm or 3-axis motion (rotation in X, Y, Z axes) such as by a 3-axis gimbal. In one example, effector assembly 16 includes, a motion feedback sensor 20 (3 or 6-axis depending upon the manipulator assembly) such as an Inertial Measurement Unit (IMU), a 6-axis force/torque sensor 22 (force in translation along X, Y, Z and torque in rotation about X, Y, Z) and a work piece interface 24 to hold the work piece. The motion feedback sensor 20 and force/torque sensor 22 measure the motion of the work piece 12 and the force and torque applied to work piece 12 to produce that motion. In other embodiments, the motion feedback sensor 20 may be implemented with a plurality of position encoders on the manipulator assembly that measure translation or rotation of the assembly itself. The motion of the work piece can be derived from the motion of the manipulator assembly. In a specific embodiment in which 6-axis motion of the manipulator is used to provide single axis rotation about an axis through the work piece center of mass/CG and parallel to the gravity vector for each of the X, Y, Z measurements, the force/torque sensor 22 may include only a torque sensor component as the applicable forces are ideally zero in this configuration. Note, even if this procedure is used to determine MOI, the force/torque sensor may be configured to include both force and torque sensors in order to determine the center of mass/CG in an earlier test procedure.

The definition of the three-axis space by an X, Y and Z-axis coordinate system is arbitrary. Any set of three orthogonal axes such as yaw, pitch and roll or $1^{st}$, $2^{nd}$ and $3^{rd}$ axes adequately define the three-dimensional space. Furthermore, the 3-axis coordinate system in which the manipulator assembly, force/torque sensor, motion sensor and work piece operate, may be translations and rotations of each other. Internally all of coordinate systems are suitably transformed to a common coordinate system for processing.

As will be further described herein the work piece MOI (and POI) is determined in one example as a manipulation element 30 commands the manipulator assembly 14 to move the work piece 12 in three-dimensional space with rotational components about each of the three axes, a measurement element 32 measures the force and torque along and about each of the three axes as the work piece is moving and measures the movement of the work piece, and a MOI determination element 34 converts the movement of the work piece to rotational acceleration in each axis, and identifies the work piece MOI 36 in each of the three axes according to the force and torque measurements and rotational acceleration in each axis. The POI 38 is similarly found except rotations are at 45 degrees off of the X, Y and Z axes. This determination may, for instance, be performed while moving the work piece between two pieces of equipment of an assembly line or testing line.

The movement of the work piece in 3D space may be arbitrary. In which case, the MOI, and POI, for all three axes is computed simultaneously from the measurements. Alternately, a serial procedure may be used to orient, rotate, measure and compute the MOI (and POI) for one axis at a time. For example, the work piece may be oriented along one axis e.g., X, Y and then Z, rotated around a measurement axis, force/torque and motion measurements made and the MOI about a specified axis (e.g., an axis through the center of mass) computed. The Parallel Axis Theorem is used to shift the calculation of the MOI from the measurement axis to the specified axis. The computation is simplified by aligning the measurement axis (the axis about which the part is rotated) parallel to the gravity vector and through the center of mass/CG to eliminate induced torque components that would otherwise have to be removed from the measurements. This is then repeated for each of the other two axes to compute MOI and again for each of the 45 degree off-axes for POI.

Figure 2A:
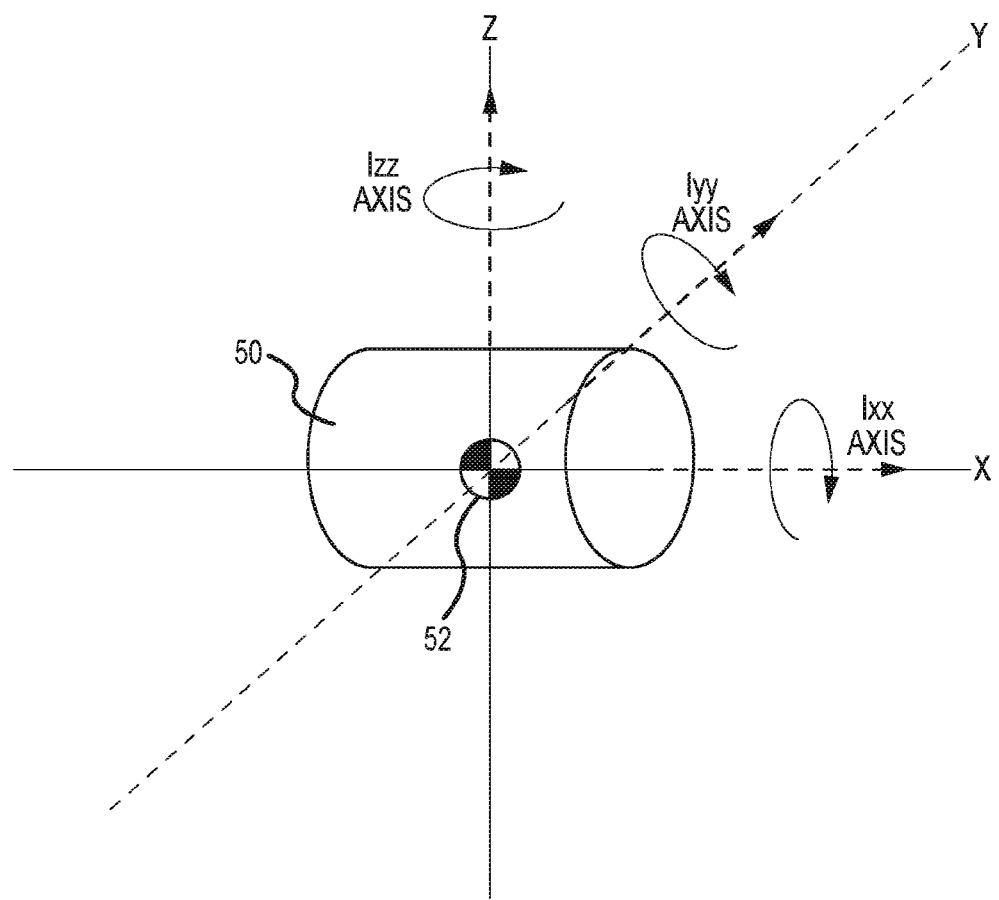
FIGS. 2*a* and 2*b* are views of a 3-axis coordinate system the physical definitions of moment of inertia (MOI) and products of inertia (POI), respectively.
Figure 2B:
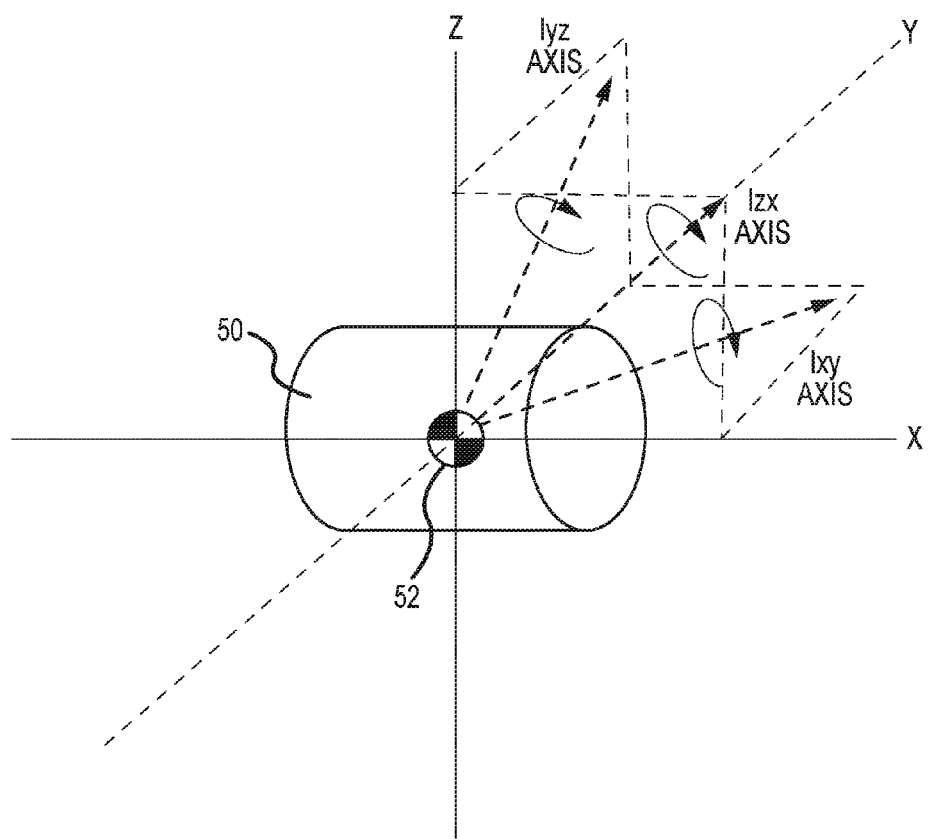

Referring now to FIGS. 2a and 2b, the physical definitions of MOI and POI for a work piece 50 having a CG (Center of Gravity) 52 are depicted. On Earth the center of mass and center of gravity are equivalent and used interchangeably. The MOI and POI are referenced to an—(X, Y, Z) coordinate system for the work piece and an axis through the CG and parallel to the gravity vector.

The mathematical definitions of MOI and POI are defined as follows:

τ=Torque,
I=Inertia, and
α=Rotational Acceleration.

From Newtonian physics, the equation for angular force and moment:

$$\tau = I^* \alpha \qquad \text{Equation 1}$$

Solving for I:

$$I = \tau/\alpha \qquad \text{Equation 2}$$

The mathematical derivation of inertia provides:

| Principle Moment of Inertia (MOI) | Products of Inertia (POI) |
|---|---|
| $I_{xx} = \iiint y^2 + z^2 \, dxdy\,dz$ | $I_{xy} = \iiint x \cdot y \, dxdy\,dz$ |
| $I_{yy} = \iiint x^2 + z^2 \, dxdy\,dz$ | $I_{yz} = \iiint y \cdot z\,dxdy\,dz$ |
| $I_{zz} = \iiint x^2 + y^2 \, dxdy\,dz$ | $I_{zx} = \iiint z \cdot x\,dxdy\,dz$ |

Placed in tensor form:

$$I = \begin{pmatrix} I_{xx} & -I_{xy} & -I_{zx} \\ -I_{xy} & I_{yy} & -I_{yz} \\ -I_{zx} & -I_{yz} & I_{zz} \end{pmatrix} \qquad \text{Equation 3}$$

The basic inertial equation assumes that each of the measurement axes pass through the work piece CG. When the measurement axis does not pass through the CG of the work piece the MOI about the CG axes can still be calculated by applying the Parallel Axis Theorem as follows:

$$I = I_{cg} + md^2 \qquad \text{Equation 4}$$

Solving for $I_{cg}$:

$$I_{cg} = I - md^2 \qquad \text{Equation 5}$$

where $I_{cg}$ is the MOI about an axis through the CG, I is the MOI about a measurement axis parallel to $I_{cg}$, m is the mass of the work piece, and d is the offset between the measurement axis and the axis through the CG. If the measurement axis is not parallel to the gravity vector an additional correction term is required.

Figure 3B:
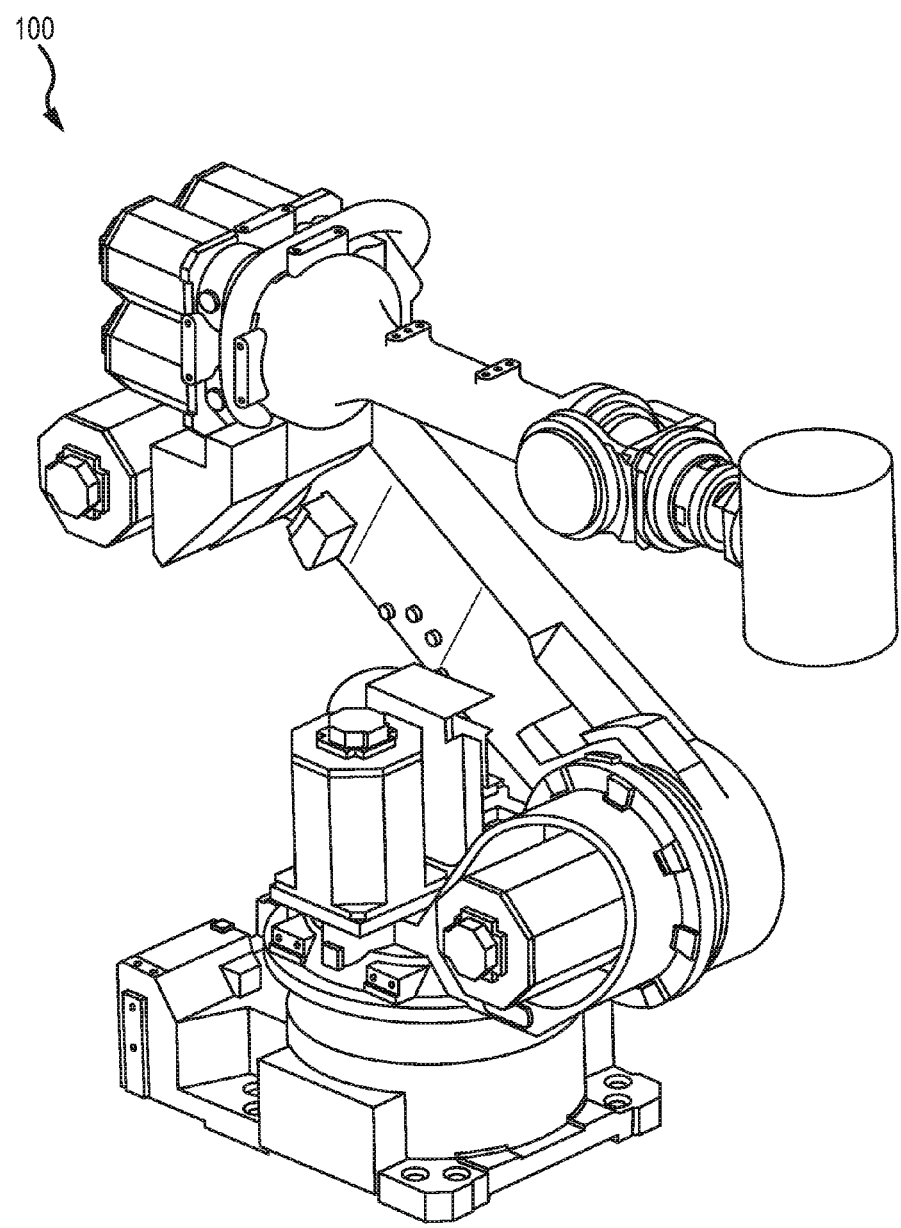

FIGS. 3a and 3b show one example of a center of mass and MOI/POI determination system 100. As described herein the determination system 100 is configured to measure and identify the location of a center of mass (including the center of mass and center of gravity) of a work piece, such as the work piece 108 coupled with the determination system 100, and to determine the MOI and POI of the work piece. The system may either determine the center of mass prior to or coincident with determining the MOI and POI.

As shown, the determination system 100 includes a manipulator assembly 102 and a force/torque sensor 150 and a motion feedback sensor 152 associated with the manipulator assembly. As will be further described herein the work piece center of mass 110 is determined in one example as the manipulator assembly 102 orients the work piece 108 through two or more orientations, for instance while moving between two pieces of equipment of an assembly line or testing line. As will be further described herein the work piece MOI and POI are determined in one example as the manipulator assembly 102 moves the work piece 108 with 3D motion including rotation about each of the axes, for instance while moving between two pieces of equipment of an assembly line or testing line.

Referring again to FIGS. 3a-3b, the determination system 100 includes in an example a manipulator assembly 102, a force/torque sensor 150 and a motion feedback sensor 152 coupled with the manipulator system 102. In the example shown, the force/torque sensor 150 and motion feedback sensor 152 are interposed between the work piece 108 and the manipulator assembly 102 at an effector assembly 106. As shown in the example of FIGS. 3a-3b, the effector assembly 106 is coupled with the manipulator assembly 102 at an effector interface 118. Effector assembly 106 includes motion feedback sensor 152, force/torque sensor 150 and a work piece interface 156. In another example, the effector assembly 106 is integral to the manipulator assembly 102. For instance, the effector assembly 106 including the force/torque sensor and motion feedback sensor is provided as a portion of the effector interface 118.

The manipulator assembly 102 shown in FIGS. 3a and 3b includes a multiple degree of freedom robotic arm (e.g., a manipulator arm 104). The manipulator arm suitably provides 6 degrees of freedom (3 translation in X, Y, Z and 3 rotational in X, Y, Z) but may provide only 3 degrees of freedom (3 rotational in X, Y, Z). Six degrees of freedom provides more flexibility to rotate the work piece about any arbitrary point in 3D space.

As shown, the manipulator arm 104 includes a manipulator base 112, a manipulator boom 114 and a manipulator arm member 116 coupled together at a plurality of joints interposed there between to provide 6 degrees of freedom. As further shown in FIGS. 3a-3b, each of the manipulator base 112, the manipulator boom 114, the manipulator arm member 116 as well as the effector interface 118 are operated (rotated, twisted, spun or the like) with one or more actuators at joints. For instance, as shown in FIGS. 3a-3b the manipulator base 112 is shown coupled with the manipulator boom 114 with an interposing base actuator 120 that provides rotational actuation for the manipulator arm 104. As further shown, a boom actuator 122 is interposed between the manipulator boom 114 and the manipulator base 112 (e.g., coupled with a portion of the base actuator 120) to accordingly provide another axis of rotational movement for the manipulator arm 104. As further shown in FIGS. 3a-3b, an arm actuator 124 is interposed between the manipulator arm member 116 and the manipulator boom 114 to provide for rotational movement of the manipulator arm member 116 relative to the manipulator boom 114. In yet another example, an interface actuator 126 is interposed between the manipulator arm member 116 and the effector interface 118 to accordingly provide one or more of rotation or tilting of the work piece 108 for instance by way of rotation or tilting of the effector interface 118 relative to the manipulator arm member 116. As shown in FIGS. 3a-3b the work piece 108 is coupled with the manipulator arm member 116 by way of the effector interface 118. Each actuator typically includes a positional encoder 158 to accurately measure the translational and rotational position along one of the axes. The robotic arm uses this information to perform the manipulations. The encoders could also be used as the motion feedback sensor 152 in which the velocities and rotational accelerations are derived from the position measurements. The manipulator arm 104 is in one example a multiple degree of freedom robotic arm manufactured or sold by ABB, Kuka, Staubli, Fanuc or other entities.

Referring again to FIG. 3a the determination system 100 in another example includes a center of mass determination module 128 suitably implemented in a computing system 159. As shown in the schematic view the center of mass determination module 128 is in communication with components of the determination system 100 including, but not limited to, the manipulator assembly 102 (one or more of the actuators described herein) as well as the effector assembly 106 including for instance the force/torque sensor 150. As shown in FIG. 3a, in one example the center of mass determination module 128 includes a manipulation element 130. The manipulation element 130 provides instructions to each of the actuators such as the base actuator 120, the boom actuator 122, the arm actuator 124 and the interface actuator 126. In another example, the manipulation element 130 provides instructions, for instance through the effector assembly 106, to the work piece 108 coupled to the effector assembly 106 to reconfigure itself for instance for the determination of a second center of mass. As shown in FIG. 3a the work piece 108 includes a work piece center of mass 110. In another example in a reconfigured state, for instance with one or more portions of the work piece 108 removed or reoriented (corresponding to jettisoned rocket stages, fins, canards or the like, deployment of solar panels, instruments or the like), the work piece 108 has a second work piece center of mass. In such an example, the center of mass determination module 128 measures the work piece center of mass 110 (shown in FIG. 3a) as well as second, third or supplemental centers of mass of the work piece 108. Additionally the manipulation element 130 moves the work piece 108 through the plurality of orientations (two or more) to facilitate the sensing and measurement of the work piece center of mass 110 (and supplemental work piece centers of mass as desired).

As further shown in FIG. 3a, the center of mass determination module 128 further includes a force and torque measurement element 132. The force and torque measurement element 132 is in communication with the effector assembly 106 (including the force/torque sensor in either the integral or separate examples described herein). The force and torque measurement element 132 measures the force and torque at the effector assembly 106 during the manipulation of the work piece 108 in the two or more different orientations to thereby determine components of the location of the work piece center of mass 110. As further shown in FIG. 3a an identification element 134 is also included with the center of mass determination module 128 to facilitate the identification of the work piece center of mass 110 for instance by analysis of the force and torque measurements taken for the work piece 108 in the two or more orientations.

In an example, the work piece is positioned in at least two different orientations relative to a gravity vector with the manipulator assembly and force and torque measurements are made. Positioning the work piece in at least two different orientations includes positioning relative to first, second and third axes, positioning the work piece in the first orientation with a zero moment around the first axis to align the work piece center of mass with one of the second or third axes and positioning the work piece in the second orientation with a zero moment around the second axis to align the work piece center of mass with one of the first or third axes different from the second axis. In the first orientation measuring the first torque and at least the first force includes measuring a weight with the force/torque sensor, measuring the first torque around one of the third or second axes unaligned with the work piece center of mass, and wherein in the second orientation measuring the second torque includes measuring the second torque around one of the third or first axes unaligned with the work piece center of mass. Identifying the work piece center of mass includes determining a first location of the work piece center of mass along the first axis based on the measured first torque and the measured weight, determining a second location of the work piece center of mass along the second axis based on the measured second torque and the measured weight, and indexing the work piece center of mass according to the determined first and second locations.

Referring again to FIG. 3a the determination system 100 in another example includes a MOI determination module 160 suitably implemented in computing system 159. MOI determination module 160 computes both the MOI and POI given different sets of data for rotations about the X,Y, Z axes and about axes 45 degrees from those defined axes. As shown in the schematic view the MOI determination module 160 is in communication with components of the determination system 100 including, but not limited to, the manipulator assembly 102 (one or more of the actuators described herein) as well as the effector assembly 106 including for instance the force/torque sensor 150 and motion feedback sensor 152. As shown in FIG. 3a, in one example the MOI determination module 160 includes a manipulation element 162. The manipulation element 162 provides instructions to each of the actuators such as the base actuator 120, the boom actuator 122, the arm actuator 124 and the interface actuator 126 to provide 3D motion for the work piece 108, possibly simultaneously in arbitrary 3D motion or serially one axis at a time. In another example, the manipulation element 130 provides instructions, for instance through the effector assembly 106, to the work piece 108 coupled to the effector assembly 106.

As further shown in FIG. 3a, the MOI determination module 160 further includes a force and torque measurement element 164. The force and torque measurement element 164 is in communication with the effector assembly 106 (including the force/torque sensor 150 in either the integral or separate examples described herein). The force and torque measurement element 164 measures the force and torque at the effector assembly 106 during the manipulation of the work piece 108 through 3D motion to thereby determine components of the MOI and POI. A motion feedback sensor element 166 is in communication with the effector assembly 106 (including the motion feedback sensor 152 in either IMU example described or the actuator encoders). The motion feedback sensor element 166 measures the motion (e.g., 6-axis velocity and accelerations) at the effector assembly 106 during manipulation of the work piece 108. As further shown in FIG. 3a an identification element 168 is also included with the MOI determination module 160 to facilitate the identification of the work piece MOI and POI for instance by analysis of the force and torque measurements and motion measures taken for the work piece 108 during 3D motion.

As described herein in one example the manipulator assembly 102 includes a manipulator arm 104. As shown in FIG. 3a one example of a manipulator arm 104 includes a robotic arm having a plurality of degrees of freedom (e.g., a multi-axis arm) for instance degrees of freedom provided by joints between one or more of the effector interface 118, the manipulator arm member 116, the manipulator boom 114 and the manipulator base 112. In another example, the manipulator assembly 102 includes a 3-axis gimbal. In another example, the manipulator assembly 102 includes one or more other manipulator systems including, but not limited to, multi-position and multi-axis fixtures coupled with the work piece 108. In one example, the fixtures are reoriented by way of a gyroscope, rails, positionable rings or the like to accordingly reposition the work piece 108 in the two or more orientations used to identify the work piece center of mass 110. Accordingly, the manipulator assembly 102 is not limited to the manipulator arm 104 but instead includes a plurality of systems including, but not limited to, the manipulator arm 104, gimbals, manipulation fixtures or the like configured to orient the work piece 108 in a plurality of orientations for identification of the work piece center of mass 110 and to move the work piece 108 through 3D motion e.g., arbitrary 3D motion or a sequence of 1D motion in three different axes.

Figure 4A:
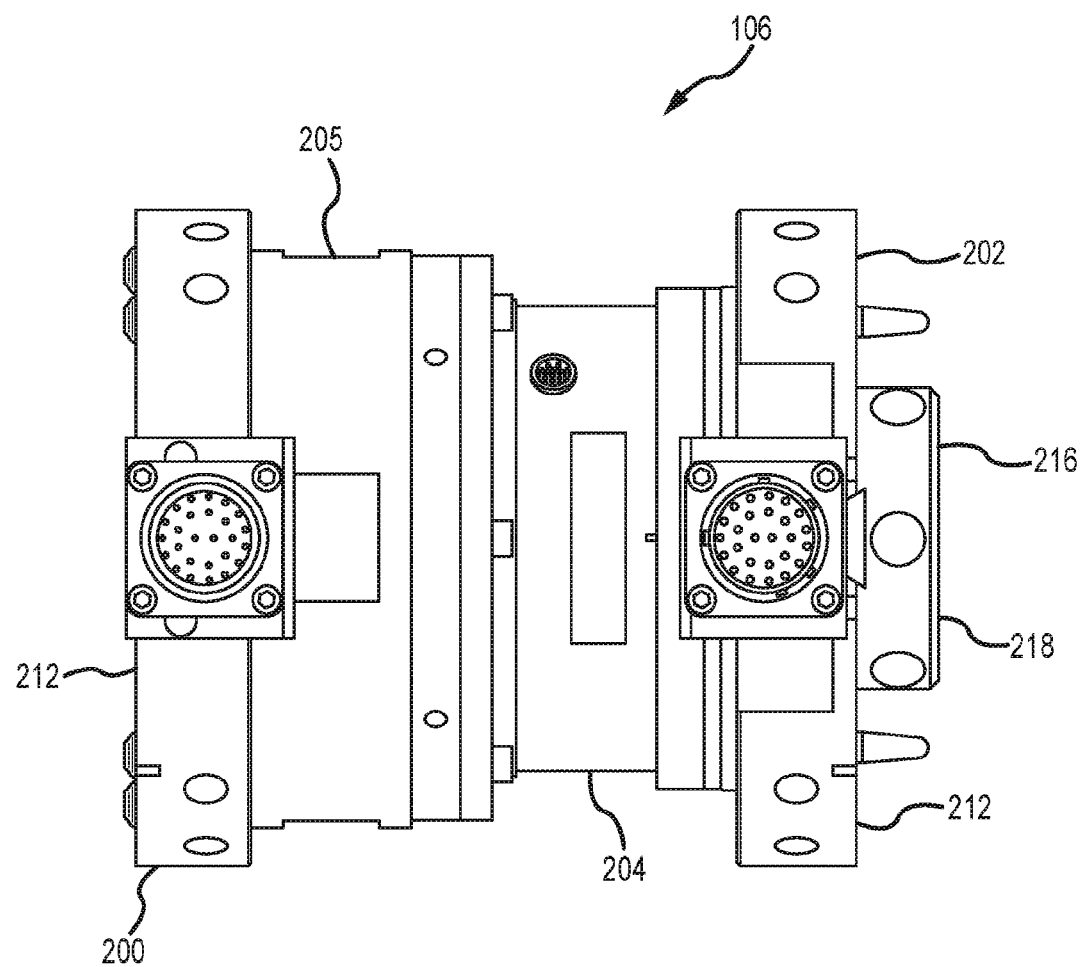
FIGS. 4*a*-4*c* are different views of one example of an effector assembly including a 6-axis force/torque sensor and a 6-axis motion sensor.
Figure 4B:
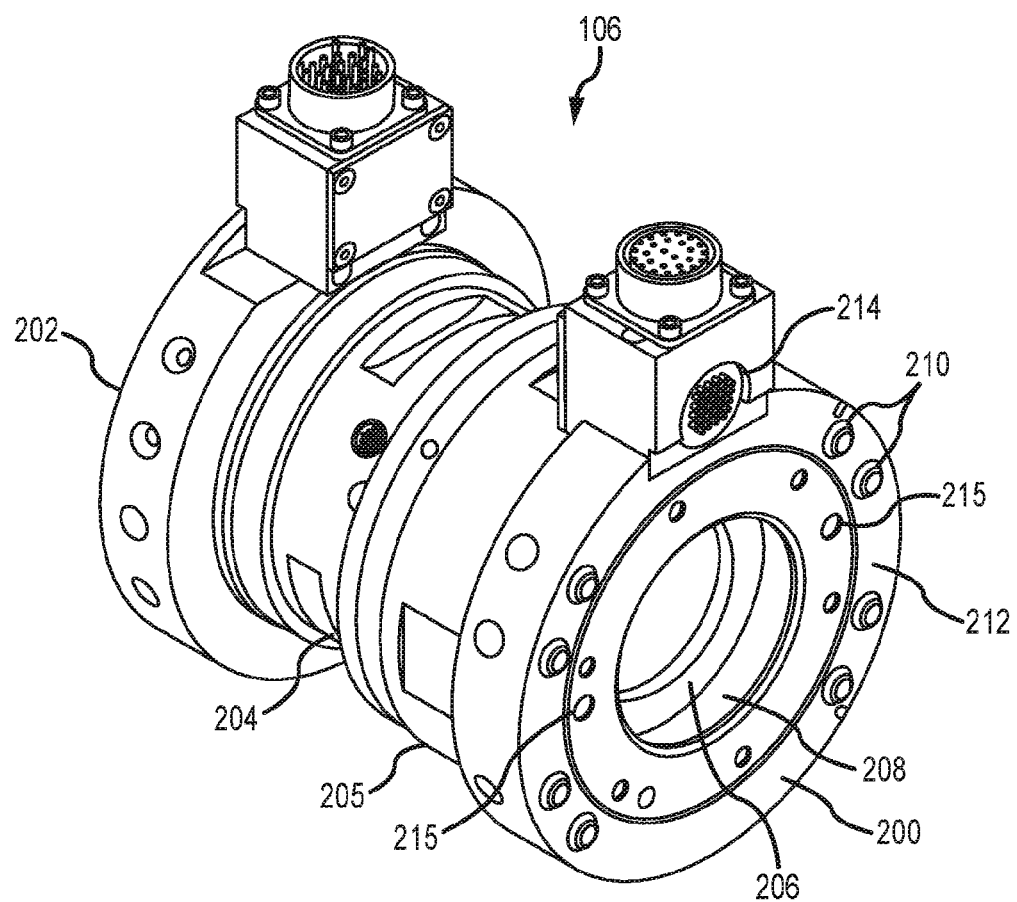
Figure 4C:
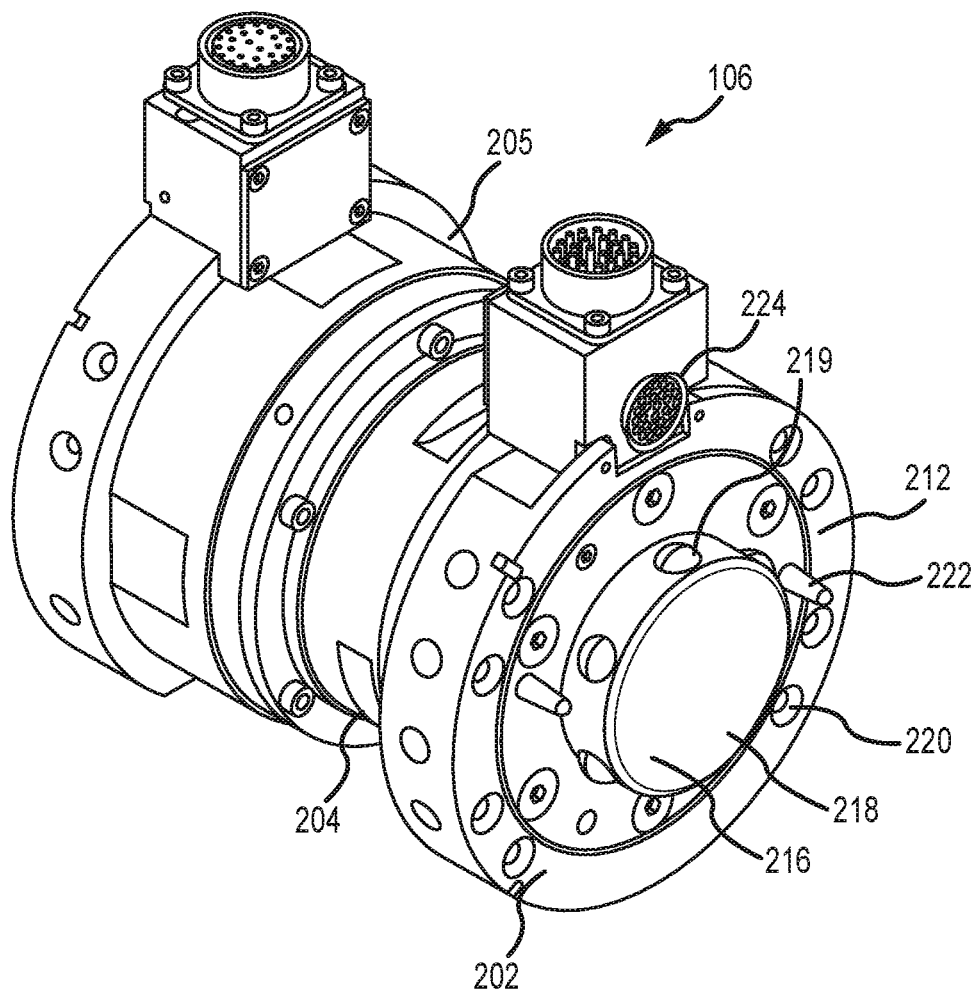

FIGS. 4A-C show one example of an effector assembly 106 configured for coupling with an interface such as the effector interface 118 of the manipulator assembly 102 shown in FIG. 3. Referring first to FIG. 4A, the effector assembly 106 is shown with a manipulator interface 200 and a work piece interface 202. In one example, the manipulator interface 200 is sized and shaped for coupling with a portion of the manipulator assembly 102 such as the effector interface 118. As will be described herein, the manipulator interface 200 optionally has a standardized fitting configured for coupling with a corresponding component of the effector interface 118 to facilitate the coupling of the manipulator interface 200 of the effector assembly 106 with the manipulator assembly 102. In a similar manner, the work piece interface 202 includes a corresponding fitting configured for coupling with the work piece such as the work piece 108 shown in FIG. 1. That is to say, the work piece interface 202 includes one or more standardized fittings (mechanical latches, sockets or the like) sized and shaped to couple with the work piece for instance a work piece lug coupled with the work piece 108 to facilitate the fixed coupling of the work piece 108 to the manipulator assembly 102 for manipulation of the work piece 108 during center of mass identification.

A force/torque sensor 204 is interposed between the manipulator and work piece interfaces 200, 202. Preferably the force/torque sensor 204 is as close to the work piece as possible. As described herein the force/torque sensor 204 measures force (e.g., weight, mass as related to weight by gravity or the like) and torque of the work piece 108 while in a cantilevered position extending from the effector assembly 106. The force/torque sensor 204 measures force in translation along each of the X, Y, Z axis and measures torque in rotation about each of the X,Y, Z axis. The force/torque sensor 204 is in one example, a composite sensor including both force and torque measurement capabilities. In another example, the force/torque sensor 204 includes separated sensors coupled together or within a consolidated housing. Some examples of force/torque sensors included, but are not limited to, sensing assemblies manufactured or sold by Omega, Futek, Kistler, RobotIQ, ATI.

A motion feedback sensor 205 is interposed between the manipulator and work piece interfaces 200, 202. As described herein the motion feedback sensor 205 measures the velocity and acceleration in 6-axis, 3 in translation and 3 in rotation. The motion feedback sensor 205 is in one example, a composite sensor including measurement capabilities for all 3 axes. In another example, the motion feedback sensor 205 includes separated sensors, one for each axis, coupled together or within a consolidated housing. The motion feedback sensor may be configured to measure position, from which the requisite accelerations are derived. Some examples of motion feedback sensors included, but are not limited to, sensing assemblies manufactured or sold by Northrop Gruman LN200 and Honeywell HG1900.

Referring now to FIG. 4B, a perspective view of the effector assembly 106 is provided including the manipulator interface 200. As shown, the manipulator interface 200 includes an arm reception socket 206 (e.g., a mechanical latch or part of a mechanical latch). The arm reception socket 206 optionally includes a latch groove 208 extending along the annular interior surface of the arm reception socket 206. The latch groove 208 is sized and shaped to receive a plug, such as a mechanical latch (or component of a mechanical latch including the socket 206) including a corresponding shape to the arm reception socket 206. In one example, the plug includes one or more latch bearings that are operated for instance with a pneumatic piston to drive the bearings into tight snug engagement along the surfaces of the latch groove 208 of the arm reception socket 206. One example of a mechanical latch 216 is shown on the opposed work piece interface 202 (see FIG. 4C), and a similar mechanical latch is optionally included with the effector interface 118 for use with the manipulator interface 200 and the arm reception socket 206. As described herein, the mechanical latch includes one or more of the arm reception socket 206 (and the latch groove 208) and the latching mechanism, such as the exemplary mechanical latch, latch 216. That is to say the mechanical latch includes one or more of the socket and latch received in the socket.

In another example, the manipulator interface 200 includes a latch collar 212 housing the arm reception socket 206 and the latch groove 208. Optionally, the latch collar 212 provides a housing for one or more effector pneumatic ports 210 configured to provide pneumatic fluid (e.g., air) to the effector assembly 106 for instance to supply pneumatic actuation at the work piece interface 202, such as at the mechanical latch 216 and latch bearings 219 (as further described herein).

Referring again to FIG. 4B, in one example the manipulator interface 200, for instance the latch collar 212, also includes a data and power link 214. As will be described herein, in one example the data and power link 214 allows for communication between the center of mass determination module 128 and the effector assembly 106, for instance the force/torque sensor 204 or motion feedback sensor 205. In another example, the data and power link 214 is an interface to the work piece 108 for instance to convey instructions to reconfigure the work piece. As will be described herein, in another example the latch collar 212 of the work piece interface 202 includes a second data and power link 224. In one example, the second data and power link 224 is in communication with the data and power link 214 shown in FIG. 2B to transmit instructions from the manipulator interface 200 (coupled with the effector interface 118 and a corresponding data port thereon) to the work piece 108. The second data and power link 224 is in one example coupled with a corresponding port provided on the work piece 108. Accordingly, by providing instructions through the data and power links 214, 224 reconfiguring or implementation of testing procedures for the work piece 108 are readily transmitted through the effector assembly 106 to the work piece 108.

Referring now to FIG. 4C, the effector assembly 106 is shown from an opposed view, for instance showing an end of the work piece interface 202. In a similar manner to the manipulator interface 200 the work piece interface 202 includes a latch collar 212, and the latch collar extends around a mechanical latch 216. As shown, the latch collar 212 surrounds the mechanical latch 216 and further provides an interface to a work piece, such as the work piece 108 shown in FIGS. 3a-3b. For instance, as shown in FIG. 4C the latch collar 212 includes in one example a second data and power link 224 sized and shaped for coupling with a corresponding data port on the work piece 108. As described herein the second data and power link in such an arrangement is used to convey information to and from the work piece, for instance instructions to reconfigure the work piece 108 into a deployed configuration, a transformed configuration (without one or more rocket stages, with the shell removed, with solar panels or instruments repositioned or the like). In another example, the second data and power link 224 initiates testing procedures in the work piece 108 to thereby allow the work piece 108 to assume a partially active state, for instance during the center of mass determination conducted with the center of mass determination module 128. Accordingly the second data and power link 224 facilitates the operation of the work piece 108 for one or more different testing operations that are distinct or related to the center of mass determination.

Referring again to FIG. 4C, as shown the work piece interface 202 in one example includes a plurality of effector pneumatic ports 220. In a similar manner to the second data and power link 224, in one example the effector pneumatic ports 220 are provided on the work piece interface 202 to accordingly provide pneumatic power to the work piece 108. As previously described herein the manipulator interface 200 (see FIG. 3B) also includes a plurality of effector pneumatic ports 210. In one example the effector pneumatic ports 210 of the manipulator interface 200 are coupled with the pneumatic ports 220 of the work piece interface 202 with one or more pneumatic tubes extending between the ports.

As further shown in FIG. 4C, the mechanical latch 216 is shown in this example as a projecting component extending from the work piece interface 202. For instance, the mechanical latch 216 includes, but is not limited to, a latch plug 218 sized and shaped for reception within a socket such as a socket similarly configured to the arm reception socket 206 shown in FIG. 4B. Such a socket for the work piece 108 is provided by way of a standardized fitting or lug provided on the work piece. The reception of the latch plug 218 within a corresponding socket in one example allows for the deployment of one or more bosses, projections or the like including for instance the latch bearings 219 into a corresponding latch groove to anchor the work piece 108 to the effector assembly 106. In one example a pneumatic piston is provided within the latch plug 218 that is driven in a downward (out of the page) fashion to deploy the latch bearings 219 into the corresponding latch groove of the work piece 108. In this manner the manipulator interface 200 fixedly couples the effector assembly 106 to the work piece 108. Similarly, the reception of a mechanical latch of the effector interface 118 in the arm reception socket fixedly couples the effector assembly 106 to the manipulator assembly 102. Accordingly the work piece 108 is solidly clamped to the manipulator assembly 102 with the force/torque sensor 204 coupled to the work piece 108 to ensure the work piece is robustly coupled (force and torque is measured) while moved through the plurality of orientations used for the center of mass determination (with the center of mass determination module 128 shown in FIG. 3a-3b).

In another example, referring again to FIGS. 4B, 4C one or more of the manipulator interface 200 and the work piece interface 202 include alignment pins or alignment sockets configured to align the various ports such as the effector pneumatic ports 210, 220, the data and power link 214, 224 or the like with corresponding features on either of the effector interface 118 or the work piece 108. For instance, referring to FIG. 4B alignment sockets 215 are provided on opposed sides of the latch collar 212. The alignment sockets 215 are sized and shaped to receive two or more pins, such as alignment pins, extending from the effector interface 118. Reception of the alignment pins within the alignment sockets 215 ensures alignment between pneumatic ports and data and power links on each of the effector interface 118 and the manipulator interface 200. Accordingly, with coupling of the effector interface 118 to the manipulator interface 200 the effector pneumatic ports 210 and the data and power link 214 are automatically coupled with the corresponding components of the effector interface 118.

In a similar manner, FIG. 4C includes one or more alignment pins 222 sized and shaped for reception within corresponding sockets provided on the work piece 108. The alignment pins 222, when received within corresponding alignment sockets, ensure the effector pneumatic ports 220 and the second data and power link 224 (where present) or the like are automatically aligned with the corresponding components on the work piece 108.

FIG. 5 shows the determination system 100 interposed between two pieces of equipment, such as first and second pieces of equipment 300, 302. As previously described herein, the first and second pieces of equipment 300, 302 are in one example stations or components of a larger assembly or testing line used with one or more work pieces, such as the work pieces 108 shown in FIG. 5. For instance the first piece of equipment 300 includes but is not limited to a conveyor, assembly line station, testing station or the like that transports or interacts with the work piece 108. The manipulator assembly 102, for instance including a manipulator arm 104, couples with the work piece 108 at the first piece of equipment 300 and moves the work piece 108 to the second piece of equipment 302.

As further shown in FIG. 5, the second piece of equipment 302 is in one example a conveyor. In another example the second piece of equipment 302 includes, but is not limited to, another piece of equipment for instance a component of assembly or testing lines. By including the determination system 100 in line with an assembly or testing line (e.g., between first and second pieces of equipment 300, 302) the work piece center of mass 110 and MOI/POI are readily and rapidly determined between the pieces of equipment without otherwise removing the work piece 108 from the assembly or testing line. Accordingly each of the work pieces 108 for instance a plurality of work pieces moved along the assembly or testing lines automatically have their work piece centers of mass 110 identified without transport and testing at a separate center of mass measurement and identification station including, but not limited to, a load table housed at a separate portion of a manufacturing floor or in an entirely different building.

The manipulator assembly 102 orients the work piece 108 in two or more differing orientations between the first and second pieces of equipment 300, 302 to determine the work piece center of mass 110 shown in FIG. 5. In each of the two or more orientations between the first and second pieces of equipment 300, 302 one or more of forces and torques are measured by the force/torque sensor 204 (see FIGS. 4A-C) for the work piece 108 to identify the work piece center of mass 110. In each of the two or more orientations the force/torque sensor 204 measures one or more of the force and torque incident on the sensor 204 determine one or more components (x, y and z components) of the location of the work piece center of mass 110. While moving with 3D motion between the first and second pieces of equipment 300, 302 forces and torques are measured by the force/torque sensor 204 and the motion is measured by motion feedback sensor 205 (see FIGS. 4A-C) for the work piece 108 to identify the work piece MOI and POI. Accordingly after movement of the work piece 108 from the first piece of equipment 300 to the second piece of equipment 302 the work piece center of mass 110 and MOI/POI are identified and the work piece 108 continues along one or more of the assembly or testing lines.

In another example the determination system 100 is configured to operate the work piece 108. As previously described herein, the determination system 100 includes a data and power link such as the data and power links 214, 224 shown in FIGS. 4B and 4 C. The determination system 100, for instance through the center of mass determination module 128 and MOI determination module 160, reconfigures the work piece 108 into one or more differing orientations (e.g., with panels, instruments or the like deployed relative to the remainder of the work piece). Redeployment or reconfiguring of the work piece 108 moves the work piece center of mass 110 and changes the MOI/POI and generates second, third or supplemental work piece centers of mass and MOI/POI accordingly to the number of configurations. In one example the manipulator assembly 102 moves the work piece 108 in each these configurations into two or more orientations to accordingly identify the corresponding centers of mass and moves the work piece with 3D motion to accordingly identify the corresponding MOI and POI. The first work piece center of mass 110 as well as supplemental work piece centers of mass (second, third or the like) and MOI/POI (second, third or the like) are determined for the work piece 108 while moving the work piece 108 between the first and second pieces of equipment 300, 302. Time-consuming steps including bolting of the work piece, measurement of weight with multiple sensors, decoupling and reorienting the work piece, and remeasurement (and optional reconfiguration) of the work piece 108 on load tables is thereby avoided.

Additionally in another example the center of mass determination module 128 or MOI determination module 160, by way of the data and power links 214, 224, is configured to conduct one or more tests or other procedures on the work piece 108 unrelated to the center of mass determination. For instance, the center of mass determination module 128 (including for instance another testing module separate from center of mass identification) is configured to operate one or more systems or subsystems of the work piece 108 to test the systems and determine the operability of the overall work piece 108.

While communication between the center of mass determination module 128 or MOI determination module 160, the effector assembly 106 (including the force/torque sensor 204 and motion feedback sensor 205) and the work piece 108 are discussed in examples herein with data and power links 214, 224 in another example, communication between features of the determination system 100 is conducted with, but not limited to, wired communication, wireless communication elements (e.g., blue tooth, radio frequency, near field or the like) or the like. Stated another way, the data and power links 214, 224 described herein are broadly considered to cover communication interfaces (e.g., contacts and receptacles containing the same), wired connections, wireless connections and the like.

Referring again to FIG. 5 in another example the determination system 100 includes an effector magazine 304. One example of the effector magazine 304 is shown in a schematic fashion at the top of FIG. 5. As shown, the effector magazine 304 includes a plurality of effector assemblies 106, 306, 308, 310. The effector assemblies 106, 306-310 are in one example configured to each have varying load capabilities. That is to say the effector assembly 106 shown in FIG. 5 coupled with the manipulator assembly 102 has a first set of load capabilities (force and torque range) while the other effector assemblies 306, 308, 310 have load capabilities different relative to the effector assembly 106. For instance, in one example the effector assembly 310 is configured to have a high load capability for force and torque relative to the other effector assemblies such as the effector assemblies 106, 306 and 308. Conversely, the leftmost effector assembly 306 has a smaller load capacity relative to the remainder of the effector assemblies 106, 308, 310. Optionally, one or more of the effector assemblies 106, 306-310 have similar or identical load capabilities and are used as replacement effector assemblies when an error or fault is detected with an installed effector assembly.

Each of the effector assemblies 306, 106, 308, 310 are in one example stored in the effector magazine 304 for instance in one or more effector receptacles 312, 314, 316, 318 sized and shaped to receive each of the effector assemblies therein. In one example the effector assemblies 306 have similar footprints that vary with regard to size and are received in similarly sized receptacles 312-318. In another example, the effector assemblies 306,106, 308, 310 have varying shapes and sizes according to the force/torque sensors, mating collars and other components of used with each of the respective effector assemblies. Each of the effector receptacles 312, 314, 316, 318 are accordingly sized and shaped for reception of the appropriate effector assembly therein.

In an example, each of the effector receptacles 312-318 is located at set locations on the effector magazine 304 to facilitate index of the receptacle locations for use with the automated manipulator assembly 102. In another example, each of the effector receptacles 312-318 the effectors 106, 306-310 (or both) include one or more of RFID chips, barcodes, signal generators, recognizable labels (e.g., machine vision) or the like to facilitate the identification of the appropriate receptacles as well as the effector assemblies therein. The determination system 100 includes an identification mechanism, including, but not limited to, a photo eye, machine vision sensor, RFID sensor or the like configured to read one or more labels on the effector assemblies themselves or the appropriate effector receptacles. The determination system 100 identifies the appropriate effector assembly 306 needed for a particular work piece 108 (also having its own identification chip, label or the like), manipulates the effector interface 118 (FIG. 3) into alignment with the specified effector assembly and couples with the effector assembly 306, 106, 308, 310 having an appropriate force and torque capability to measure the center of mass of the work piece 108.

In operation, a work piece 108 at the first piece of equipment 300 is scanned at some point along the assembly or testing line (or by the determination system 100 including an appropriate sensor). Recognition of the type of work piece 108 prompts the determination system 100 to identify the appropriate effector assembly from the effector magazine 304. The determination system 100 in such an example moves the presently installed effector assembly 106 into its effector receptacle 314 and decouples and stores the effector assembly 106 therein. The appropriate effector assembly, for instance the effector assembly 310, within the corresponding effector receptacle 318 is coupled with the manipulator assembly 102 at the effector interface 118 and withdrawn from the effector receptacle 318. As previously described herein, in one example the effector interface 118 couples with the manipulator interface 200 (shown in FIG. 4B) with the reception of a mechanical latch within the arm reception socket 206.

After coupling the effector assembly 310 with the manipulator assembly 102 the manipulator assembly 102 reorients the effector assembly 310 to couple with the work piece 108. The coupled work piece 108 is moved between the first and second pieces of equipment 300, 302 through at least two orientations and 3D motion where one or more of force and torque measurements are conducted on the work piece 108. The work piece center of mass 110 and MOI/POI are determined (e.g., with the force and torque measurement and identification elements 132, 134 of the center of mass determination module 128 and similar elements of the MOI determination module 160 shown in FIG. 3). The work piece 108 is positioned on the second piece of equipment 302 where the work piece 108 continues along to another assembly line station or testing station of an overall assembly or testing line.

Figure 6:
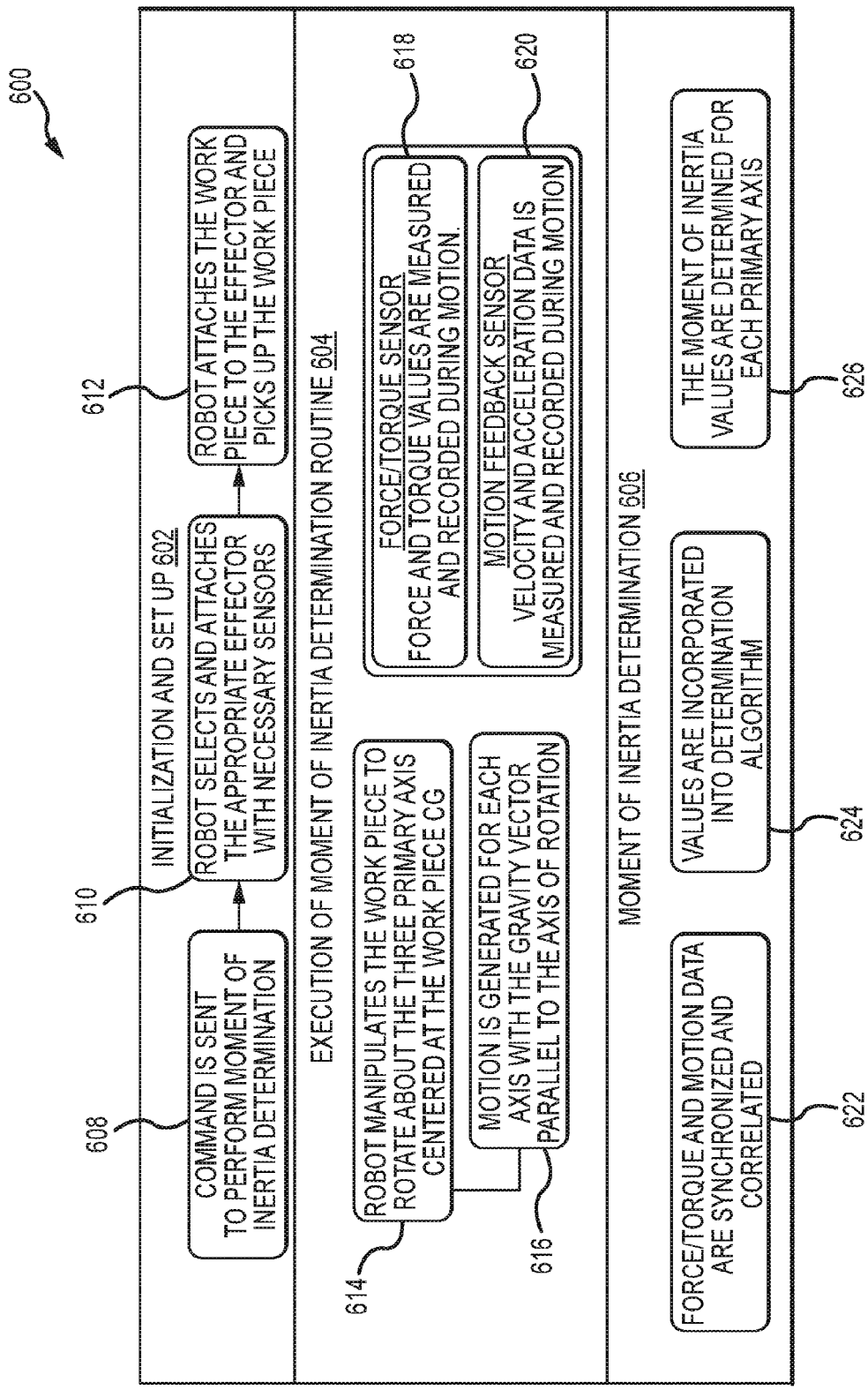
FIG. 6 is an embodiment of a flow diagram for automatically identifying the MOI of a work piece.
Figure 7:
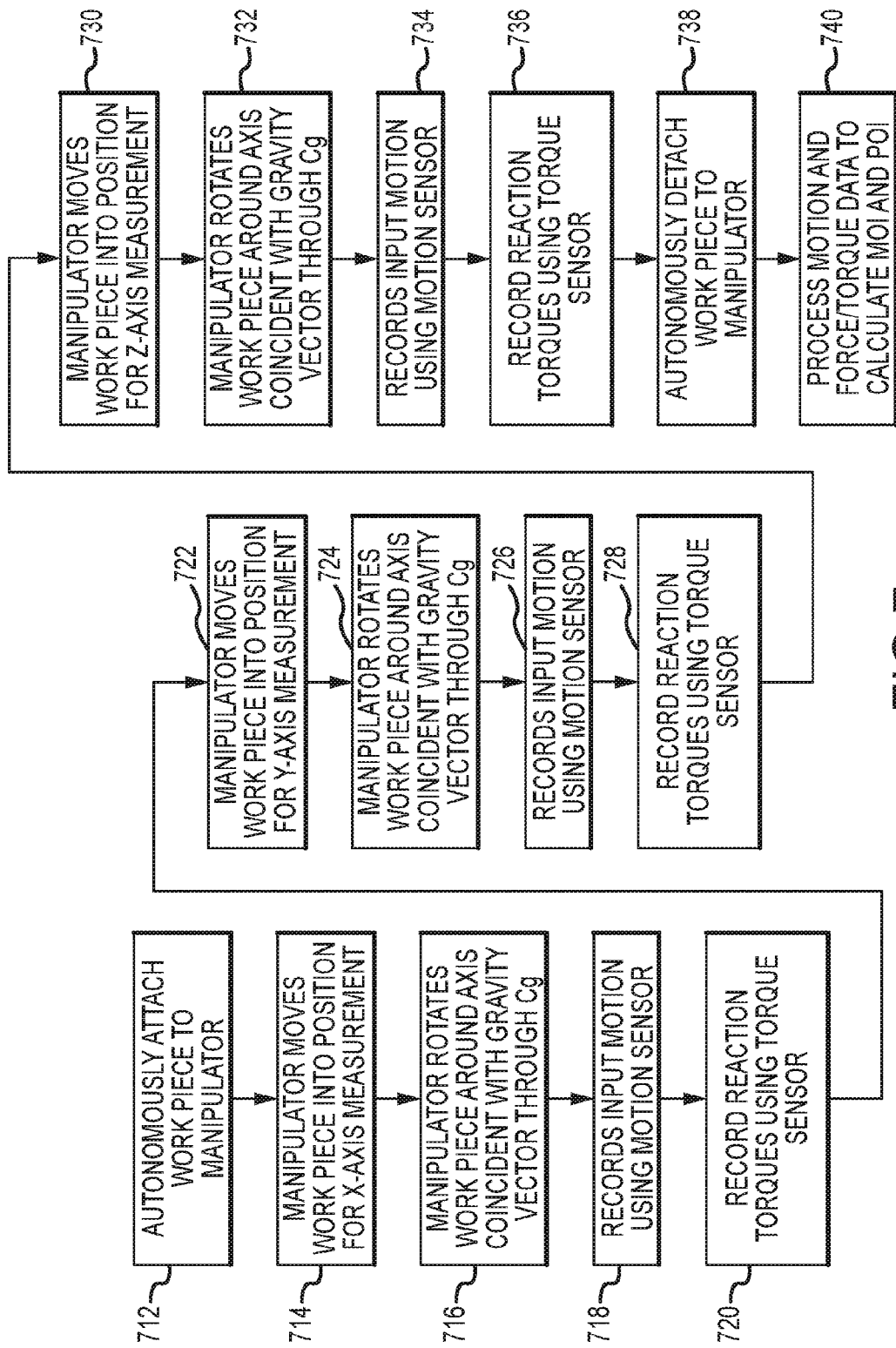
FIG. 7 is an embodiment of a flow diagram for automatically identifying the MOI of a work piece in which the work piece is rotated about an axis through its Cg and parallel to the gravity vector with the work piece aligned to each of the X, Y and Z-axes.
Figure 9C:
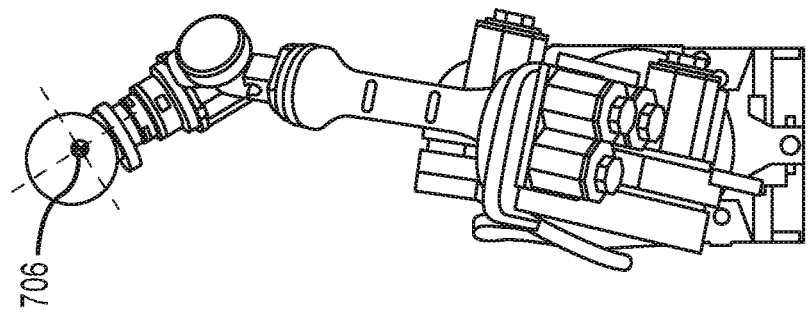
FIGS. 9*a*-9*c* are snap-shots showing the 6-axis motion of the robotic system to rotate the work piece about its Cg and parallel to the gravity vector for the X-axis orientation.
Figure 9B:
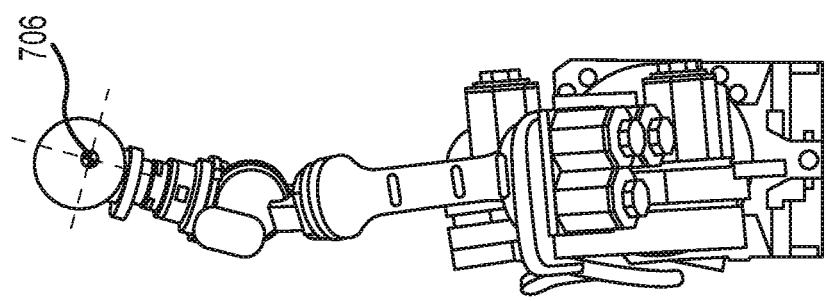
Figure 9A:
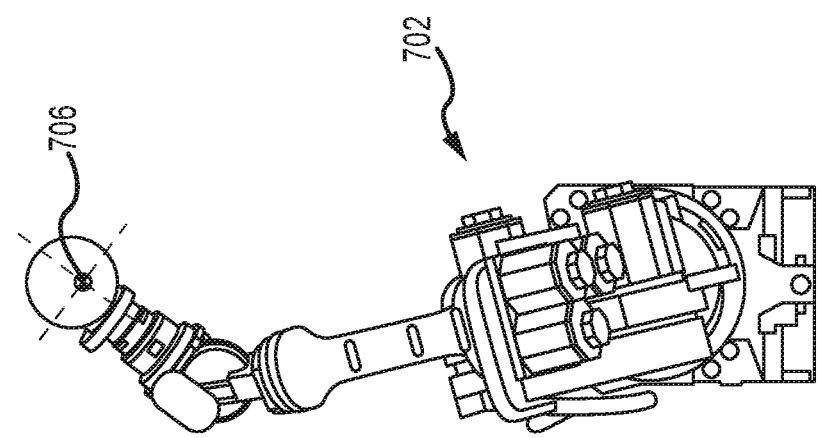

Referring now to FIG. 6, an exemplary method 600 for determining MOI of a work piece using a 6-axis robot is presented. The work piece POI can be found in an identical manner save with the rotation about the corresponding offset axes. A similar method as described above may be performed first to determine the center of mass. Alternately, this method may be performed twice to determine the center of mass along with the MOI and POI. The method 600 generally includes the steps of initialization and set up 602, execution of MOI determination routine 604 and MOI determination 606.

Initialization and set up starts by sending a command to the robot to perform MOI determination (step 608). The robot selects and attaches the appropriate effector with the necessary sensors (step 610), attaches the work piece to the effector and picks up the work piece (step 612). Execution of the MOI determination routine includes commanding the robot to manipulate the work piece in 3D space (step 614). This motion may be arbitrary or, in this example, rotation about the three primary axes (X, Y, Z) centered at the work piece Cg. Ideally, the work piece is manipulated such that the axis of rotation is parallel with the gravity vector to avoid the necessity of removing the effects of gravity from the measured data (step 616). As the work piece is moving through the 3D space, the force/torque sensor measures and records 6-axis (3 translation, 3 rotation) force and torque values (step 618) and the motion feedback sensor measures and records 6-axis velocity and acceleration data (step 620). Note, in this embodiment force measurements are not required for the MOI/POI determinations. The force measurements is provided to take measurements for center of mass determination and the force measurements are recorded as a matter of course The force measurements are not required for the MOI/POI determination. In this embodiment, the force sensor is provided to take measurements for center of mass determination. The force measurements are recorded as a matter of course. Moment of inertia determination includes synchronizing and correlating the force/torque and motion data (step 622), incorporating the values into an appropriate motion determination algorithm (step 624) and determining the MOI values (and POI values) for each primary axis (step 626). The appropriate motion determination algorithm is determined by the constraints on motion of the work piece e.g., arbitrary 3D motion, sequential rotation about the primary axis centered at CG or sequential rotation about the primary axis offset from CG. The data may be filtered using conventional techniques to identify and remove outliers or bad data. The data or results from the data may be averaged or fit to improve the accuracy of the MOI and POI values.

Referring now to FIGS. 7, 8*a*-8*c* and 9*a*-9*c*, an exemplary embodiment of a method 700 for determining work piece MOI uses a 6-axis robot arm as the manipulator 702 to position a work piece 704 in three different orthogonal orientations for X, Y and Z measurements and in each orientation rotate the work piece around an axis 706 coincident with a gravity vector 708 through the work piece CG 710. The X, Y and Z directions are arbitrary with respect to the work piece as long as they are orthogonal to each other. Full 6-axis motion of the robot is required to provide the single axis rotation about the gravity vector for each measurement orientation. Note, if properly aligned to rotate about an axis parallel to the gravity vector and through the work piece CG there are no applicable forces generated by the motion of the work piece, only torques. Thus, only a torque sensor is required in this configuration to determine MOI/POI. The hardware may include a force/torque sensor to accommodate other procedures (arbitrary 6-axis motion or rotation about a point offset from the CG), to measure any error terms, or determine center of mass. More generally, the 6-axis capability allows the robot to rotate the work piece about any axis parallel to the gravity vector or any point in 3D space.

To implement method 700, the work piece 704 is autonomously attached to the manipulator 702 (step 712).

The manipulator moves the work piece into position for the X-axis measurement (step 714) and rotates the unit around an axis coincident with the gravity vector through Cg (step 716). The system records the manipulator input motion using the motion sensor (step 7518) and simultaneously records the reaction torques produced by the motion with a torque sensor (step 720).

The manipulator moves the work piece into position for the Y-axis measurement (step 722) and rotates the unit around an axis coincident with the gravity vector through Cg (step 724). The system records the manipulator input motion using the motion sensor (step 726) and simultaneously records the reaction torques produced by the motion with a torque sensor (step 728).

The manipulator moves the work piece into position for the Z-axis measurement (step 730) and rotates the unit around an axis coincident with the gravity vector through Cg (step 732). The system records the manipulator input motion using the motion sensor (step 734) and simultaneously records the reaction torques produced by the motion with a torque sensor (step 736).

The work piece is autonomously detached from the manipulator (step 738). Data from the motion sensor and torque sensor are compiled and processed through a series of algorithms to calculate the resultant moments of inertia (MOI) (step 740). When using this configuration for MOI determination the simplest form of the algorithm as given by equation 2 above can be used. The entire process may be repeated for the off-axis orientations to calculate the resultant POI.

Referring now to FIGS. 10a-10c, an alternate embodiment of a method for determining work piece MOI uses a 6-axis robot arm as the manipulator 1000 to position a work piece 1002 in three different orthogonal orientations for X, Y and Z measurements and in each orientation rotate the work piece around an axis 1004 at the work piece interface 1006 parallel to and offset from a gravity vector 1008 through the work piece Cg 1010. Forces are required (and measured) to rotate the work piece about an axis offset from the Cg.

The techniques required to determine MOI from an axis of rotation offset from the CG gravity vector are similar to the simplified case, but include a correction factor known as the Parallel Axis Theorem. In the equations detailed below, $I_1$ is the MOI of the workpiece calculated about the axis of rotation using equation 2 as previously defined. $I_{CG}$ is the MOI of the workpiece about the CG gravity vector. Also, d is the linear distance between the axis of rotation and the CG gravity vector and m is the mass of the workpiece.

The equation for each axis was defined in equation 5 by $I_{CG}=I_1-m^*d^2$. Further application of the parallel axis theorem also provides the ability to determine the work piece CG location if not previously known. This is accomplished by calculating the workpiece MOI about two parallel but distinct axis of rotations using eqn. 2. And algebraically determining the CG as is detailed below. This method is referred to as "Dual Point Inertia and Center of Gravity". In this case d1 and d2 are the distances between the work piece CG gravity vector and the rotation point for the $1^{st}$ and $2^{nd}$ setups, respectively. The distance x between d1 and d2 is known (via setup), thus enabling the solution to the equations. I1 and I2 are the Moments of Inertia of the workpiece calculated about the respective axes of rotation, and $I_{CG}$ is the MOI of the workpiece about the CG gravity vector.

The system of equations for each axis is defined by:

$$I_{CG}=I_1-m^*d_1^2 \quad \text{Equation 5}$$

where $I_1$ and m are measured and $I_{CG}$ and $d_1$ are unknown, $$I_{CG}=I_2-m^*d_2^2 \quad \text{Equation 6}$$

where $I_2$ and m are measured and $I_{CG}$ and $d_2$ are unknown, and $$d_2=d_1+x \quad \text{Equation 7}$$

where x is the measured physical offset.

The 3 equations (equations 5, 6 and 7) now provide sufficient information to solve for the 3 unknowns ($d_1$, $d_2$ and $I_{CG}$) using algebraic techniques.

Figure 11:
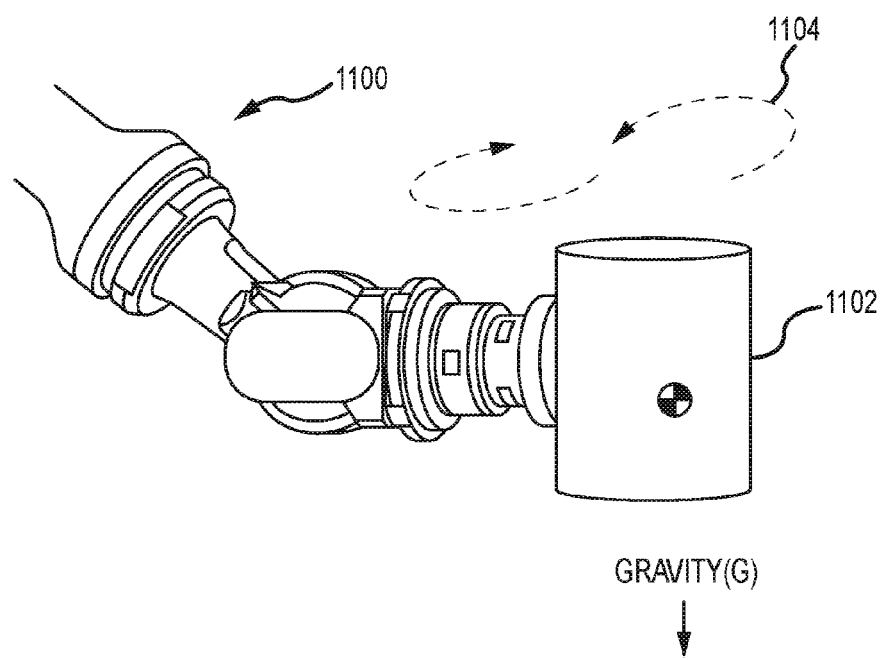
FIG. 11 is an embodiment showing arbitrary three-dimensional motion of the work piece.

Referring now to FIG. 11, an alternate embodiment of a method for determining work piece MOI uses a 6-axis robot arm as the manipulator 1100 to move a work piece 1102 with arbitrary three-dimensional motion 1104. Force, torque and movement measurements are taken as the work piece moves through the three-dimensional motion. The algorithms for "Free Movement", which solve equations in 6 DOF (see www.springer.com 2: The Generalized Missile Equations of Motion) using the 6-axis force and torque measurements and 6-axis movement measurements are defined as follows. The below equations are specific to missile motion and assume symmetry about the roll axis corresponding to products of inertia Ixy=Iyz=0.

TABLE 2.1

Axis and Moment Nomenclature (a) Axis Definition

| Axis | Direction | Name | Linear Velocity | Angular Displacement | Angular Rates |
|---|---|---|---|---|---|
| OX | Forward | Roll | u | φ | P |
| OY | Right Wing | Pitch | v | θ | Q |
| OZ | Downward | Yaw | w | ψ | R |

(b) Moment Designation

| Axis | Moment of Inertia | Product of Inertia | Force | Moment |
|---|---|---|---|---|
| OX | $I_x$ | $I_{xy}=0$ | $F_x$ | L |
| OY | $I_y$ | $I_{yx}=0$ | $F_y$ | M |
| OZ | $I_z$ | $I_{zx}\neq 0$ | $F_z$ | N |

$$\Sigma \Delta L=\dot{P}I_x-\dot{R}I_{xz}+QR(I_z-I_y)-PQI_{xz}, \quad (2.44a)$$

$$\Sigma \Delta M=\dot{Q}I_y+PR(I_x-I_z)+(P^2-R^2)I_{xz}, \quad (2.44b)$$

$$\Sigma \Delta N=\dot{R}I_z-\dot{P}I_{xz}+PQ(I_y-I_x)+QRI_{xz}, \quad (2.44c)$$

or $$\Sigma \Delta L=\dot{P}I_x+(I_z-I_y)QR-(\dot{R}+PQ)I_{xz}, \quad (2.44d)$$

$$\Sigma \Delta M=\dot{Q}I_y+(I_x-I_z)PR+(P^2-R^2)I_{xz}, \quad (2.44e)$$

$$\Sigma \Delta N=\dot{R}I_z+(I_y-I_x)PQ-(\dot{P}-QR)I_{xz}, \quad (2.44f)$$

L, M and N are measured by the force/torque sensor while, P, Q, R are measured by the motion feedback sensor. By utilizing numerical techniques these equations can be solved for the remaining unknowns (Ix, Iy, Iz, Ixz).

Figure 12:
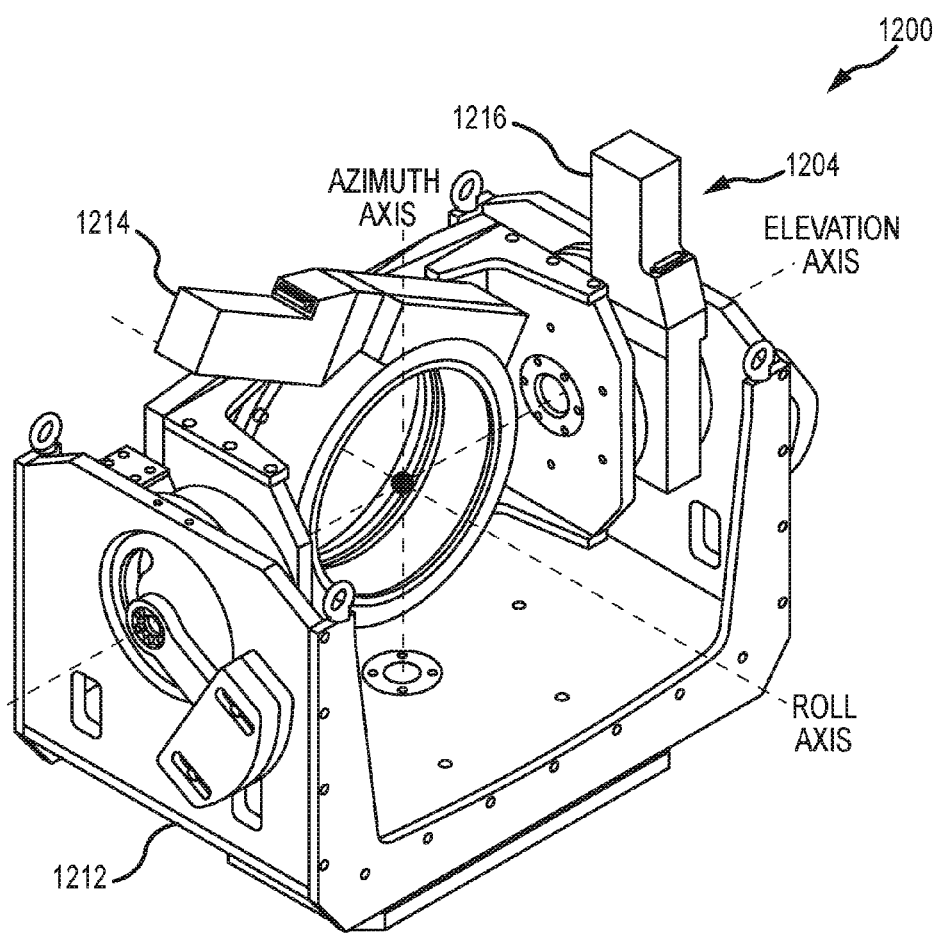
FIG. 12 is a perspective view of a 3-axis gimbal.
Figure 13A:
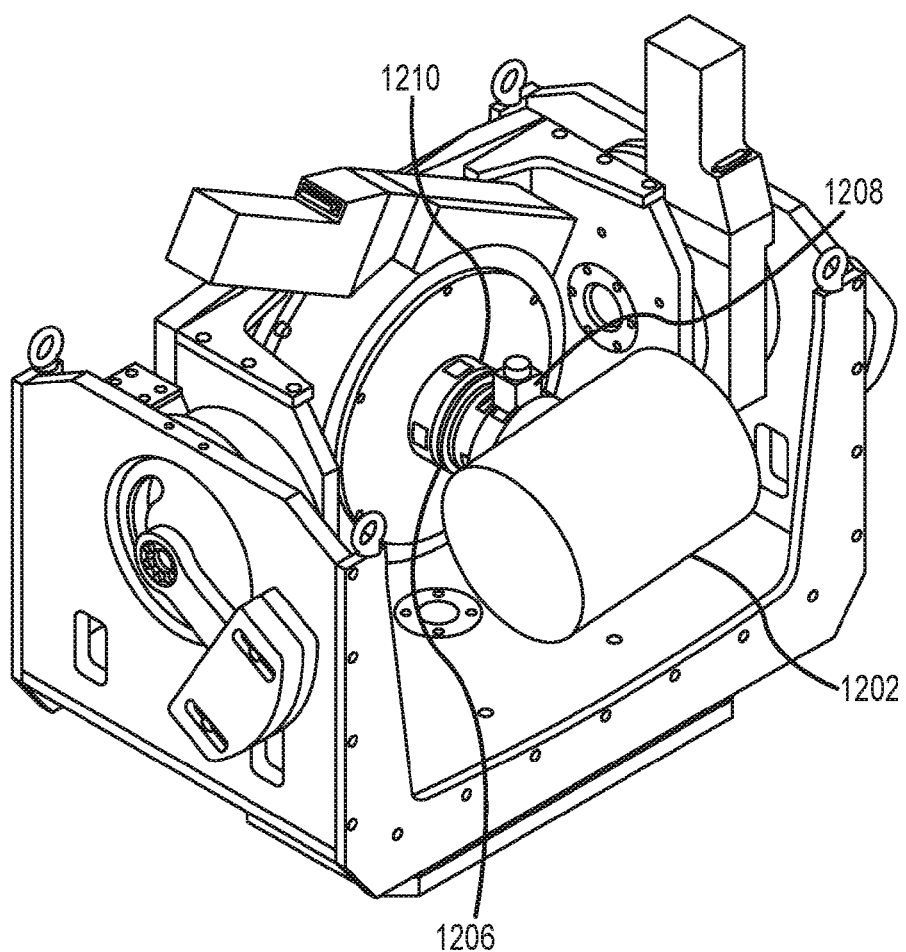
FIGS. 13*a*-13*b* are perspective and aerial views of an effector and work piece mounted on the 3-axis gimbal to determine MOI of the work piece.
Figure 13B:
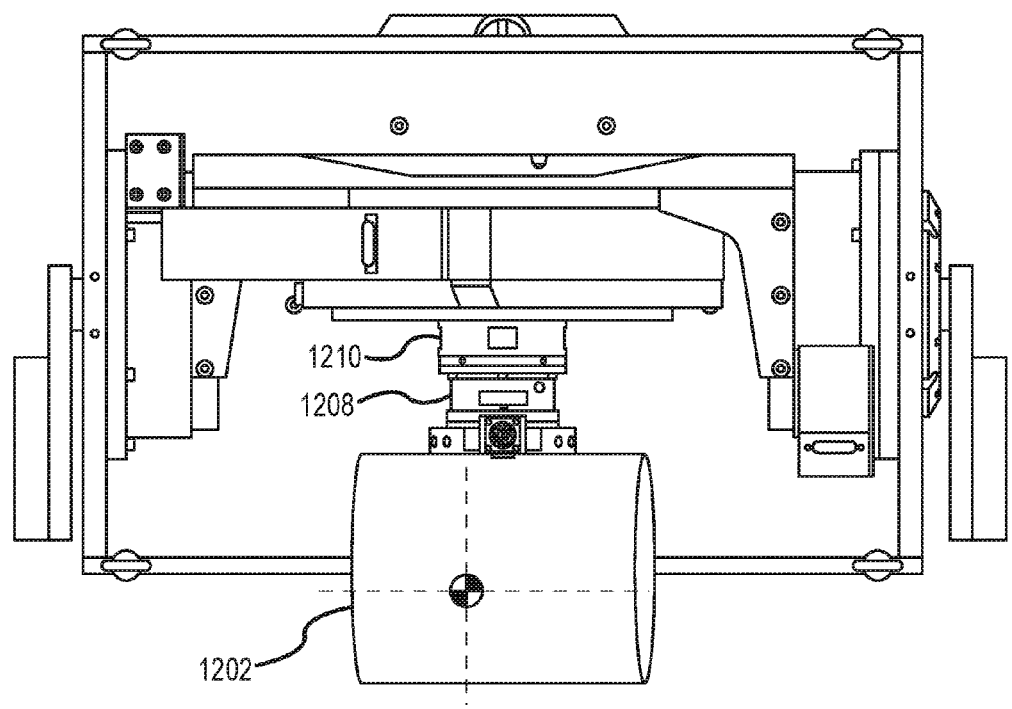

Referring now to FIGS. 12 and 13a-13b, an embodiment of a manipulation assembly 1200 for determining a MOI for a work piece 1202 includes a 3-axis gimbal 1204. Work piece 1202 is manually mounted on 3-axis gimbal 1204 via an effector 1206 that suitably includes a force/torque sensor 1208 and a motion feedback sensor 1210. Alternately encoders on the stage motors may be used to define the motion feedback sensor.

3-axis gimbal 1204 provides motion articulation about three primary axes typically referred to as the Azimuth, Elevation and Roll Axes or X, Y, Z. Motion is generated by separate stage motors 1212, 1214 and 1216 that can be driven simultaneously. The 3-axis gimbal can produce either (a) rotation about a single axis for either the X, Y, Z measurement at the work piece interface or (b) complex motion through a combination of motion about the three axes.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A method for automatically identifying a moment of inertia (MOI) of a work piece comprising:
    coupling a work piece to a manipulator assembly including a manipulator arm having two or more members interconnected with actuators at joints and an effector assembly having a force/torque sensor, wherein:
        the effector assembly is interposed between the manipulator arm and the work piece; and
        the force/torque sensor of the effector assembly is configured to measure force and torque transmitted from the work piece to the manipulator assembly and a motion feedback sensor is configured to measure motion of the work piece;
    moving the work piece and the effector assembly in a three-axis coordinate system with the actuators of the manipulator arm, said motion including at least rotation of the work piece about each of three axes;
    measuring with the force/torque sensor at least a first force and at least a first torque for each of the three axes as the work piece is moving;
    measuring with the motion sensor the movement of the work piece including at least a first rotation about each of the three axes; and
    identifying the MOI in each of the three axes according to at least the measured first torque and first rotation for each of the three axes.

2. The method of claim 1, wherein the manipulator assembly includes a robotic arm capable of 6-axis motion including three-axis translation and three-axis rotation.

3. The method of claim 2, wherein coupling the work piece to the manipulator assembly includes the robotic arm autonomously picking up the work piece.

4. The method of claim 3, wherein moving the work piece in the three-axis coordinate system and measuring at least the first force, at least the first torque and at least the first rotation about each of the three axes is included with moving the work piece between first and second pieces of equipment in one or more of an assembly line or a testing line with the manipulator assembly.

5. The method of claim 2, further comprising:
    moving the work piece in the three-axis coordinate system with the manipulator assembly, said motion including at least rotation about each of three axes offset by 45 degrees from the three axes of the coordinate system;
    measuring with the force/torque sensor at least a first force and at least a first torque for each of the three offset axes as the work piece is moving;

measuring with the motion sensor the movement of the work piece including at least a first rotation about each of the three offset axes; and identifying products of inertia (POI) of the work piece in each of the three offset axes according to at least the measured first torque and at least the first force and movement for each offset axis.

6. The method of claim 2, further comprising positioning the work piece in at least two different static orientations relative to a gravity vector with the manipulator assembly, measuring a force and a torque in different static orientations, and identifying the work piece center of mass according to the force and torque measurements.

7. The method of claim 2, wherein moving the work piece in three-axis coordinate system includes with the robotic arm, moving the work piece to each of three orthogonal orientations, and for each orientation, rotating the work piece about an axis parallel to a gravity vector and through a center of mass of the work piece;

measuring with the force/torque sensor at least the first torque as the work piece is rotating about the axis;

measuring with the motion sensor at least the first rotation of the work piece about the axis; and identifying the MOI for the orientation according to at least the measured first torque and first rotation.

8. The method of claim 2, wherein moving the work piece in the three-axis coordinate system includes with the robotic arm, moving the work piece to each of three orthogonal orientations, and for each orientation, rotating the work piece about an axis;

measuring with the force/torque sensor at least the first force and at least the first torque as the work piece is rotating about the axis;

measuring with the motion sensor the rotation of the work piece about the axis; and identifying the MOI for the orientation according to at least the measured first force, first torque and rotation.

9. The method of claim 8, wherein the axis is at an unknown distance d1 from an unknown center of mass for the work piece, further comprising repeating the rotation and measurement for each orientation at a different unknown distance d1 from the unknown center of mass, and identifying both the MOI and center of mass from the measured first force, first torque and first rotation for the three axis for distances d1 and d2.

10. The method of claim 2, wherein moving the work piece in the three-axis coordinate system includes with the robotic arm, moving the work piece to simultaneously rotate about all three axes, wherein identifying the MOI includes simultaneously identifying the MOI for all three axes.

11. The method of claim 1, comprising coupling an effector assembly including the force/torque sensor and the motion feedback sensor with the manipulator assembly.

12. The method of claim 11, wherein the motion feedback sensor comprises an inertial measurement unit (IMU) that measures velocity and acceleration both in translation along and in rotation about each of the three axes.

13. The method of claim 1, wherein the motion feedback sensor comprises a plurality of encoders coupled to stage motors that provide the rotation of the manipulator assembly about each of the three axes.

14. A method for automatically identifying a moment of inertia (MOI) of a work piece comprising:

coupling a work piece to an effector assembly, the effector assembly coupled with a robotic arm capable of six-axis motion including three-axis translation and three-axis rotation, the effector assembly includes:

a work piece interface configured to grasp and hold the work piece;

a torque sensor configured to measure torque transmitted from the work piece to the effector assembly; and a motion feedback sensor configured to measure motion of the work piece about each said axis, the motion feedback sensor is coupled with at least one of the effector assembly or the robotic arm;

determining an MOI for each of three orthogonal orientations of the work piece established by the robotic arm including:

rotating the effector assembly and the work piece about an axis parallel to a gravity vector and through a center of mass of the work piece with the robotic arm;

measuring with the torque sensor at least a first torque as the work piece is rotating about the axis;

measuring with the motion sensor at least a first rotation of the work piece about the axis; and identifying the MOI for the orientation according to at least the measured first torque and first rotation.

15. A method for automatically identifying a center of mass and a moment of inertia (MOI) of a work piece comprising:

coupling a work piece to an effector assembly having a force/torque sensor, the effector assembly coupled proximate an end of a manipulator assembly, the manipulator assembly includes a motion feedback sensor configured to measure motion of the work piece;

identifying the center of mass of the work piece including:

positioning the effector assembly and the work piece in at least two different static orientations relative to a gravity vector with the manipulator assembly;

measuring a force and a torque in the different static orientations with the force/torque sensor of the effector assembly; and identifying a work piece center of mass according to the force and torque measurements; and identifying the moment of inertia of the work piece including:

moving the effector assembly and the work piece dynamically in a three-axis coordinate system with the manipulator assembly including at least rotation of the work piece about each of the three axes;

measuring at least a first torque for each of the three axes as the work piece is moving with the force/torque sensor of the effector assembly;

measuring the motion of the work piece including at least a first rotation about each of the three axes; and identifying the MOI in each of the three axis according to at least the measured first torque and first rotation about each of the three axes.

16. A method for automatically identifying a center of mass and a moment of inertia (MOI) of a work piece comprising:

coupling a work piece to an effector assembly having a force/torque sensor, the effector assembly coupled proximate and end of a manipulator assembly, the manipulator assembly includes a motion feedback sensor configured to measure motion of the work piece;

identifying the center of mass and the moment of inertia of the work piece including:

moving the effector assembly and the work piece in a three-axis coordinate system with the manipulator assembly, said motion including at least rotation of the work piece about each of the three axes;

measuring with the force/torque sensor of the effector assembly at least a first force and at least a first torque for each of the three axes as the work piece is moving;

measuring with the motion feedback sensor the movement of the work piece including at least a first rotation of the workpiece about each of the three axes; and identifying the MOI and center of mass in each of the three axes according to at least the measured first force and first torque and first rotation for each of the three axes.

17. A system configured for manipulation of a work piece and determination of a moment of inertia (MOI) of the work piece comprising:

a manipulator assembly including an effector assembly and a manipulator arm having two or more members interconnected with actuators at joints, the effector assembly is coupled with the manipulator arm proximate an end of the manipulator arm, and the effector assembly includes:

a work piece interface configured to grasp and hold a work piece while the manipulator assembly dynamically moves the effector assembly and the work piece in a three-axis coordinate system; and a force/torque sensor configured to measure force and torque transmitted from the work piece to the effector assembly;

a feedback motion sensor coupled with the manipulator assembly, the feedback motion sensor configured to measure motion of the work piece; and a MOI determination module in communication with the manipulator assembly and the force/torque sensor, the MOI determination module includes:

a manipulation element, the manipulation element configured to move the manipulator arm with the actuators at joints, the effector assembly and the work piece coupled with the effector assembly dynamically through the three-axis coordinate system including rotation of the work piece at least about each of the three axes;

a force and torque measurement element configured to measure the force and torque of the work piece in each of the three axes with the force/torque sensor;

a feedback motion sensor element configured to measure motion of the work piece including rotation about each of the three axes with the feedback motion sensor; and an identification element in communication with the force and torque measurement element and feedback motion sensor element, the identification element configured to identify the MOI according to at least the torque measurements and motion measurements conducted as the work piece moves and rotates about each of the three axes.

18. The system of claim 17, wherein the manipulator assembly includes a robotic arm capable of six-axis motion including three-axis rotation and three-axis translation.

19. The system of claim 18, wherein the robotic arm is configured to autonomously pick up the work piece and move the work piece in the three-axis coordinate system while moving the work piece between first and second pieces of equipment in one or more of an assembly line or a testing line with the manipulator assembly.

20. The system of claim 18, wherein the manipulation element is configured to move the robotic arm and the work piece to each of three orthogonal orientations, and for each orientation, rotate the work piece about an axis parallel with a gravity vector and through a center of mass of the work piece;

measure with the torque sensor at least the first torque as the work piece is rotating about the axis;

measure with the motion sensor the rotation of the work piece about the axis; and identify the MOI for the orientation according to at least the measured first torque and rotation.

21. The system of claim 17, further comprising an effector assembly coupled to the manipulator assembly, said effector assembly comprising:

a manipulator interface configured to couple with the manipulator assembly, the manipulator interface includes:

a mechanical latch configured to interfit with the manipulator assembly, and a data and power link;

a work piece interface coupled with the manipulator interface, the work piece interface includes a second mechanical latch configured to interfit with the work piece and statically couple the work piece to the work piece interface;

the force/torque sensor between the manipulator interface and the work piece interface, the force/torque sensor configured to measure force and torque between the manipulator and work piece interfaces; and the feedback motion sensor between the manipulator interface and the work piece interface, the feedback motion sensor configured to measure motion of the work piece.

22. The system of claim 17, further comprising:

a center of mass determination module in communication with the manipulator assembly and the force/torque sensor, the MOI determination module includes a manipulation element configured to position the work piece in at least two different static orientations relative to a gravity vector with the manipulator assembly, a force and torque measurement element configured to measure a force and a torque in different static orientations, and an identification element configured to identify the center of mass according to the force and torque measurements.

* * * * *